United States Patent [19]
Black et al.

[11] 3,974,778
[45] Aug. 17, 1976

[54] SPEED CONTROL SYSTEM

[75] Inventors: Millard G. Black, Santa Ana;
Warren D. Sheldon, Glendora;
Dennis S. Cook, Orange, all of Calif.

[73] Assignee: Walt Disney Productions, Burbank, Calif.

[22] Filed: Aug. 12, 1974

[21] Appl. No.: 496,389

[52] U.S. Cl. ...................... 104/148 LM; 246/182 C
[51] Int. Cl.² ........................................ B61B 13/12
[58] Field of Search ............. 104/148 LM, 148 MS, 104/152, 147 R, 147 A; 246/187 R, 186, 187 B, 249, 182 R, 182 C, 74, 63 A; 324/161

[56] References Cited
UNITED STATES PATENTS

| | | | |
|---|---|---|---|
| 3,639,753 | 1/1972 | Reich | 246/182 C |
| 3,727,046 | 4/1973 | Woods | 246/182 C |
| 3,792,665 | 2/1974 | Nelson | 104/148 LM |

Primary Examiner—Stephen G. Kunin
Assistant Examiner—Reinhard J. Eisenzopf
Attorney, Agent, or Firm—Fulwider, Patton, Rieber, Lee & Utecht

[57] ABSTRACT

A speed control system for controlling the speed of a vehicle traveling on a guideway comprising, in combination, a plurality of linear motor windings disposed along the guideway, a corresponding secondary mounted on the vehicle for inductively interacting with the proximate ones of said windings, sensing means disposed adjacent said windings for sensing the proximity of said secondary and for gating an alternating electrical signal to said adjacent winding, measuring means disposed adjacent said sensing means for measuring the rate of progression of said vehicle along said guideway, error detection means connected to said measuring means for producing an error signal in equal integer increments corresponding to the deviation of the vehicle rate from a preselected rate and commutation means connected to receive said error signal for commutating said alternating electrical signal to said adjacent winding in equal increments of power corresponding to said error signal.

15 Claims, 16 Drawing Figures

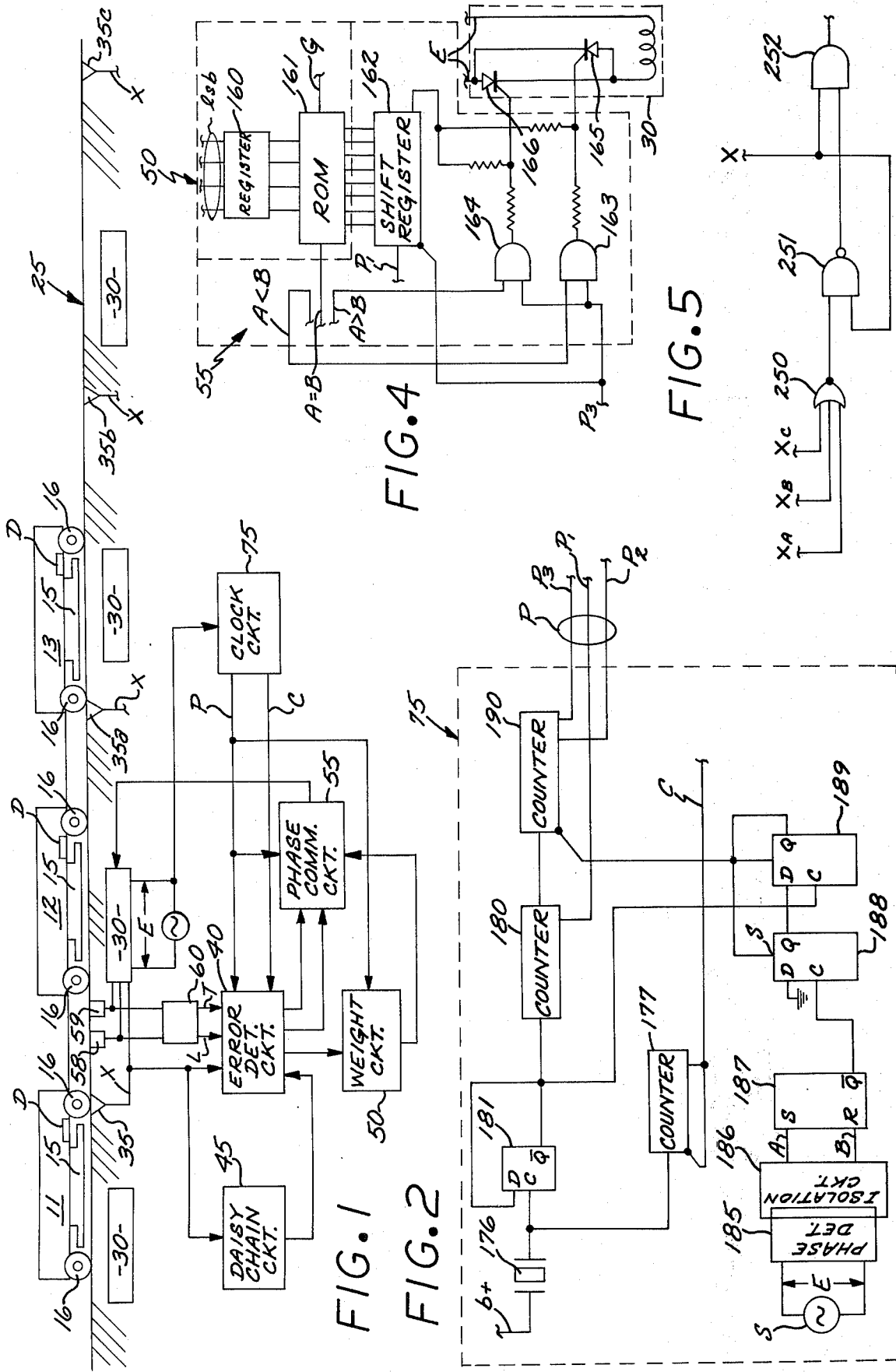

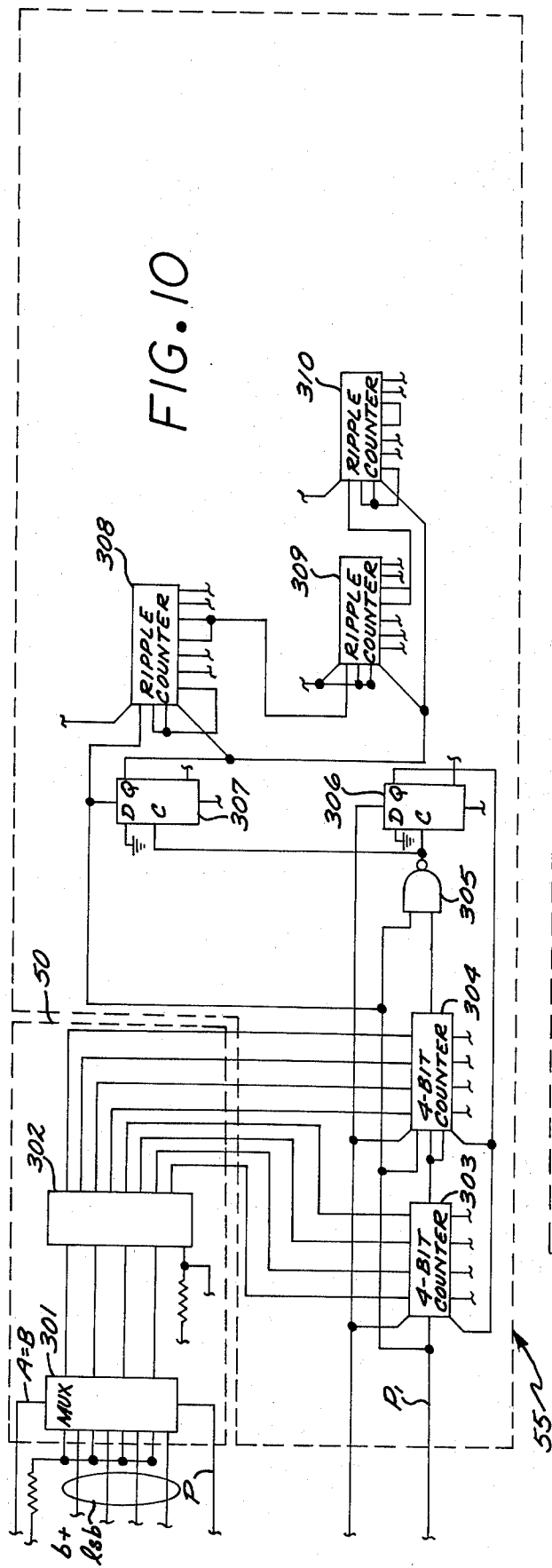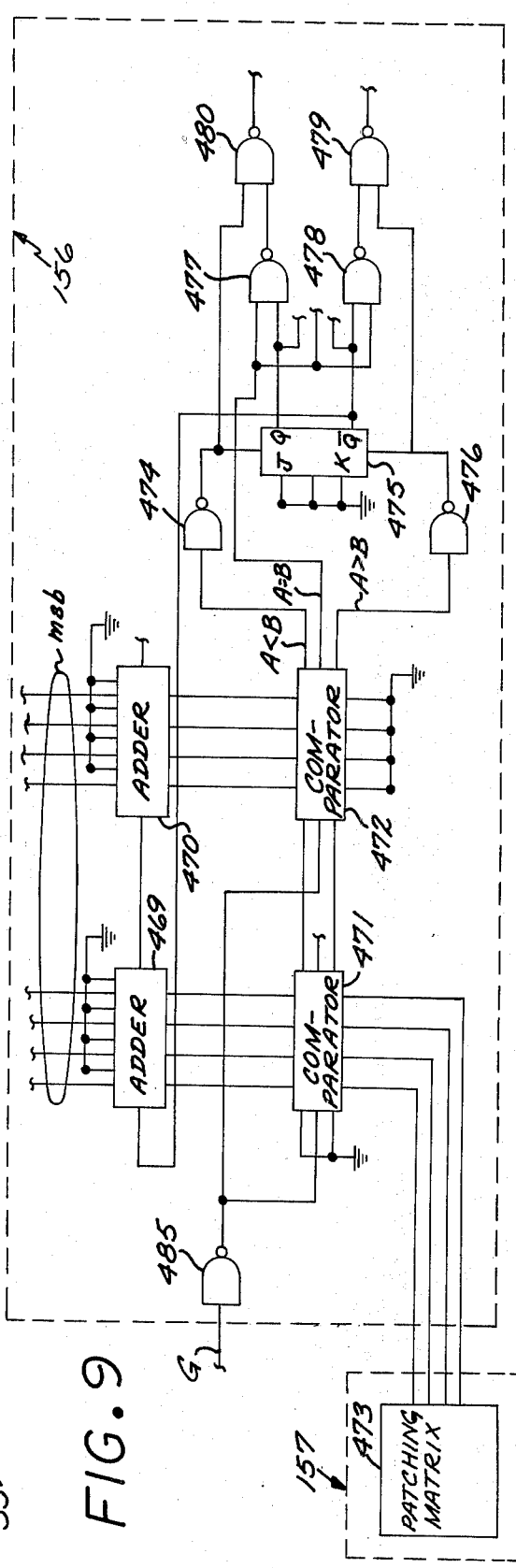

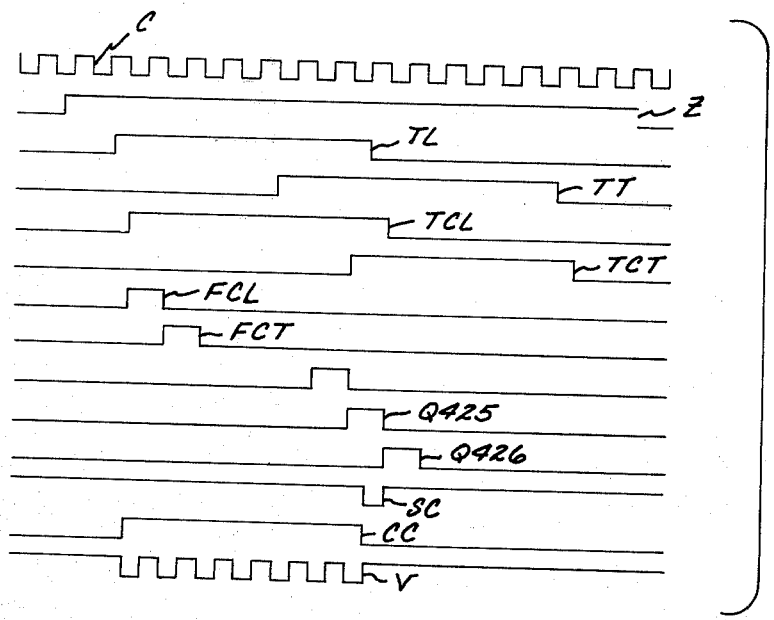
FIG. 11
FIG. 12
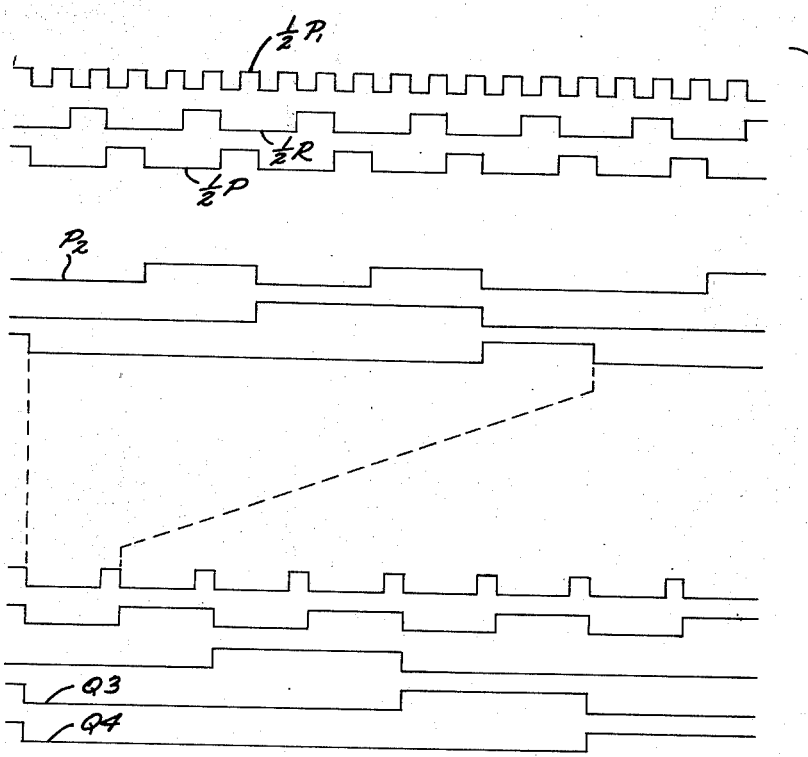

3,974,778

SPEED CONTROL SYSTEM

BACKGROUND OF THE INVENTION

1. Field of the Invention

The present invention relates to phase commutation control over inductive motors and more particularly to a speed regulation system, which by means of a linearized phase commutation of a linear inductive motor, controls the speed of a vehicle.

2. Description of the Prior Art

Induction motors, both linear and rotary type, were often controlled in the past to a desired torque output through well known phase commutation techniques. Such phase commutation techniques have been typically nonlinear in character, since the conventional timing increments which correspond to phase angle increments of an A.C. signal are usually in evenly distributed increments and the corresponding torque output or propulsive output increments of the motor follow a sine function of the signal commutated for any given torque control signal. Accordingly, as linear increments of phase are taken to commutate the motor, the resulting force or torque output follows a sine curve and phase angle increments occurring close to the 0° or 180° crossing of the since wave are therefore lower in torque than the commutation increments occurring close to the maximum of the signal sine wave. This particular feature of phase commutation has been partly met in some linear systems by appropriately shaping the reference signal against which phase commutation takes place. In prior art digital applications, however, such convenience is not normally available since typically phase commutation is accomplished according to a fixed increment clock.

Digital control systems, on the other hand, provide a plurality of known beneficial features which have been successfully utilized in the past and which typically trade off over the linear character or linear performance of the control system.

One particular application for such phase commutating control systems is automatic speed control of a linear inductive motor propelled vehicle. Such applications of vehicle propulsion when further adapted for use in amusement parks for conveying spectators include further variables where the vehicles may be loaded to various weights or where trains of various lengths are utilized. This utilization of vehicles loaded to various weights drive along a spectator guideway provides a variable which must be controlled, in synchronism with other trains, by conventional feedback techniques. In prior art, vehicle speed has been measured by measuring axle or wheel rotation. The measured speed was then compared against a desired speed and appropriate corrections were taken through selective phase commutation of the motor. Prior art systems of this kind usually involve a configuration where a part of the track or the guideway forms the secondary or the platen of the linear induction motor while the inductor itself is located within the vehicle body. While such configurations are economical in terms of the number of inductors required, they typically entail a third track which is energized and from which power is continually drawn by the vehicle or train. Since spectator guideways are often located in common with public foot paths, such third rail which is constantly energized often exposes the local pedestrians to hazard.

SUMMARY OF THE INVENTION

Accordingly, it is the general purpose and object of the present invention to provide a vehicle control system which selectively energizes sections of an inductor of a linear motor according to the proximity of the linear motor section relative the vehicle. Other objects of the invention are to provide phase commutation of the inductor in response to the speed deviation of the vehicle relative a preselected speed. Further objects of the invention are to provide phase commutation which results in linear power increments according to the departure between the speed of the vehicle and the desired speed. Yet further objects of the invention are to utilize conventional digital logic in performing such phase commutation, while at the same time utilizing conventionally available frequency generators to control such phase commutation and to measure the speed differential.

These and other objects are accomplished within the present invention by providing a track or guideway in which a plurality of linear inductor sections are buried and by providing switching circuits associated with each inductor which are switched by corresponding signalling means for selectively activating the proximate ones of the inductor sections. Accordingly, each inductor section is interposed between adjacent switching circuits, each circuit including a proximity detector formed in the manner of a magnetic circuit which when interrupted by the secondary carried in the passing vehicle will produce a switching signal. This signal is then utilized to initiate a count or a time interval of a fixed duration during which all activity of the immediately adjacent winding or inductor takes place. The speed of the vehicle relative to track is further sensed by photoelectric sensor pairs disposed at known separation increments along the track ahead of each winding, such photoelectric sensors being triggered by structure extending from the vehicle as it passes thereacross.

Thus, adjacent each linear inductor section buried in the track there is disposed a photoelectric speed trap which measures the local speed of a vehicle passing thereover by closing a dynamic flip-flop circuit which is also connected to a clock circuit to allow passage thereacross of a burst of clock pulses until the flip-flop is pulled up by the other end of the trap. The clock circuit produces a continual sequence of pulses of a predetermined frequency which are then selectively passed to a counter through the dynamic flip-flop to be accumulated. The number of pulses passed are thus counted out and converted to a parallel code by a conventional counter. The count thus developed in the counter is then compared with respect to a preset count and the count differential is then encoded according to a built-in weighting function to be shifted out through a shift register clocked at a phase-locked frequency corresponding to fixed increments of phase of the excitation signal to the adjacent winding. The weight function and the fixed phase increments thus combine to provide fixed increments of phase commutation in the winding for fixed increments of speed error. Since the winding can only be phase commutated between −180° and +180°, the limits correspond to the typical slew rate limits of a servomotor, duplicating in this manner a typical servo system. Any error count greater than either +180° or −180° phase, i.e., the maximum power available out of any adjacent winding, is not passed through the encoding logic and the shift register, thus reducing the count capacity requirement of the error detection logic with a resultant increase in accuracy.

The coarse count or error polarity is therefore accomplished in the invention by comparing selected more significant bits in the counter and the count reference such that the remaining less significant bits will be enabled only if a true or equal comparison is made on the more significant bits. If no comparison can be made on the more significant bits, the less significant bits are inactive and the most significant bits are utilized to direct a full forward or full reverse power application to the adjacent winding.

Furthermore, only when the vehicle is within the vicinity of an inductor segment or winding is the winding enabled. When enabled, the alternating electrical excitation signal is commutated according to the adjacent speed traps which register the speed of the vehicle as it approaches the winding, convert the speed to a digital count and compare the count against a fixed or a reference count, which can be selectively patched or programmed in any conventional manner. The count comparison then produces an error signal which is either much greater or much less than the plus and minus extremes in commutation, or in power control authority, and which therefore reduce to either an "on" or a "reverse" power application to the winding. Any smaller error signals or error signals within the linear or the control range of the power to the winding are then compared against a conventional reference and are shifted out of a shift register which is clocked by a phase jammed circuit tied to the A.C. signal exciting the winding. The phase jammed circuit operates on an artificial reference generated by a crystal which is then divided down to a pulse frequency approximating 1° intervals of phase of the 360° sinusoidal waveform exciting the winding. Since the pulse frequency generated in this artificial manner is almost always imprecise, a phase jamming technique is developed which at the end of every cycle rejams the counters behind the crystal to zero. The dividing counters are further utilized to provide various levels of pulse increments which can be combined in various combinations with the weighted function coming out of the error detector circuit in order to produce equal power increments to the winding. The same crystal utilized for generating the artificial 360° phase is also utilized, through a second counter chain, to provide the clock reference input to the dynamic flip-flop which generates the error count. A separate divider path is established for this clock frequency since the speed measurement is made by a fixed geometric relationship between two photo cells and is therefore independent of the phase jamming requirements necessary in commutation.

In order to provide separation between successive trains, a daisy chain circuit is formed behind the proximity detector circuits associated with each winding so that by proper permutation and combination a selected number of windings is inactivated behind a train in order to establish a field within which no speed advancement can be generated. This separation feature is adjustable by the simple expedient of logical patching and can include any number of windings from one to the maximum number of windings available in any one guideway.

A further safety feature is provided in the system by utilizing light coupled semiconductor assemblies in order to isolate the high power winding circuit from the commutation. Such is done by conventional light emitting diodes and light photosensitive semiconductor devices which perform the commutating function for each phase of the winding.

BRIEF DESCRIPTION OF THE DRAWINGS

FIG. 1 is a block diagram of a control system constructed according to the present invention;

FIG. 2 is an idealized diagram of a clock circuit constructed according to the present invention and adapted for use in the control system shown in FIG. 1;

FIG. 4 is a diagram of a commutation circuit adapted for use with the system shown in FIG. 1;

FIG. 5 is a diagram illustrating one logical interconnection of a plurality of systems of the type shown in FIG. 1;

FIG. 9 is a circuit schematic of one practical embodiment of the comparator shown in FIG. 4;

FIG. 10 is a circuit schematic of one practical embodiment illustrating the interconnections of circuit sections of FIGS. 1, 3 and 4;

FIG. 11 is a timing diagram of selected elements of FIGS. 2 and 3;

FIG. 12 is a timing diagram of other selected elements of FIGS. 2 and 3;

DESCRIPTION OF THE SPECIFIC EMBODIMENT

Figure 3:
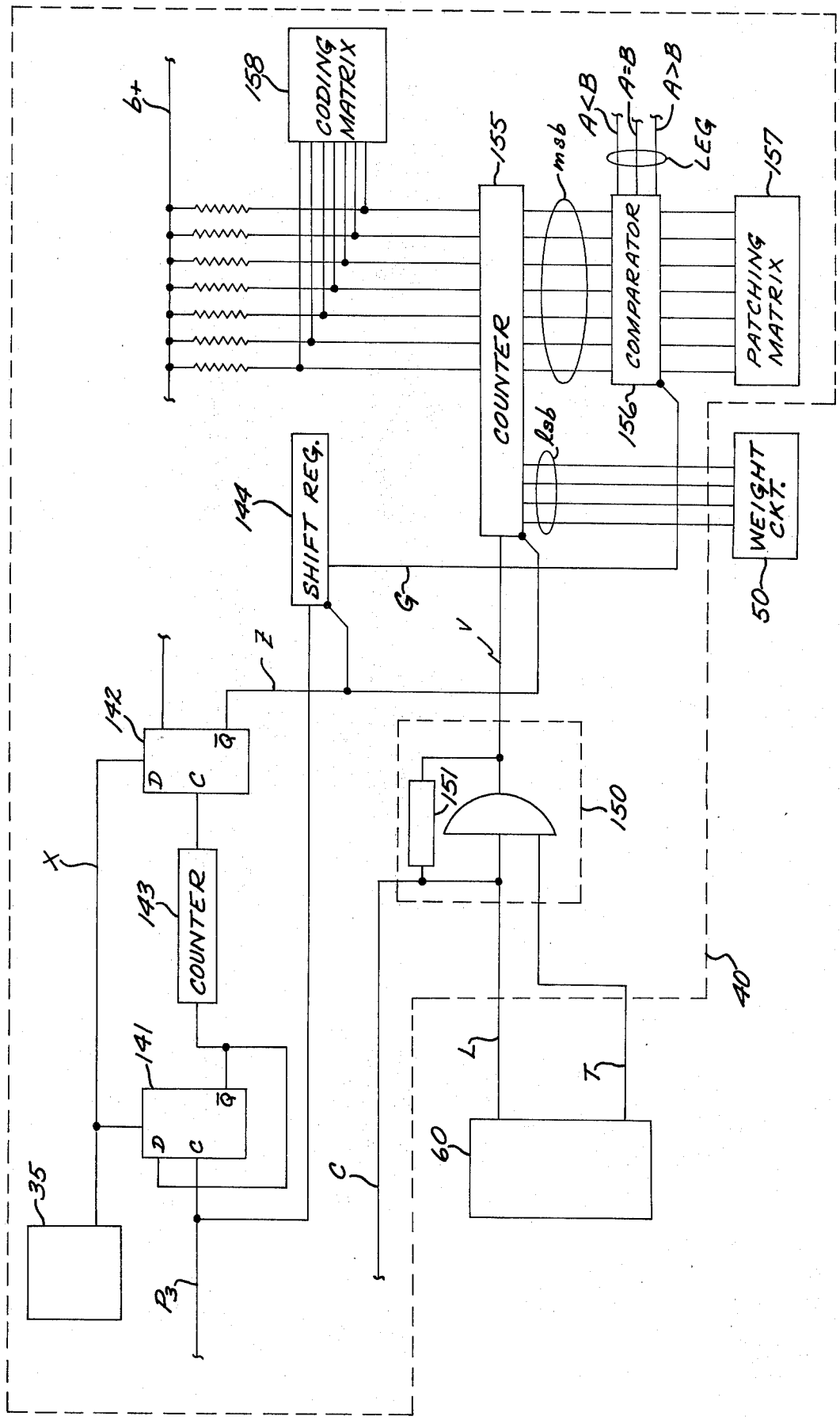
FIG. 3 is an idealized diagram of an error detector circuit constructed according to the present invention and adapted for use in the control system shown in FIG. 1.

For purposes of clarity, the description of the present invention is initially made by reference to a configuration including idealized circuit elements, without regard to whether such are presently available in commerce. The description is then subsequently directed to an assembly incorporating selected commercially available elements, by way of one example, with the connections made according to the manufacturers' instructions. In the latter instance, only limited functions are attributed to the connections made, it being understood that where circuit elements are described by manufacturers' model number, one skilled in the art will be able to appreciate the purpose of such connections.

It is to be further understood that while reference is made to integrated circuit elements, either ideal or practical, such element breakdown is maintained for descriptive purposes. More specifically, the circuits described below include integrated circuit elements integrating functions at a generally referred to level of small scale integration (SSI) or medium scale integration (MSI). Various large scale integration (LSI) systems may be available which can be functionally arranged to perform the same functions.

Referring to FIG. 1, the general operation of the system involves, for example, a combination of vehicles connected in the manner of a train, comprising vehicles 11, 12 and 13. Vehicles 11, 12 and 13 are each conventionally suspended on wheeled carriages 16 at either end, carriages 16 being guided by a guideway 25. Suspended below each vehicle is a secondary 15. Vehicles 11, 12 and 13 are supported and directed by the guideway 25 to align the secondary 15 into inductive proximity with a plurality of linear motor inductor segments or windings 30, buried within the guideway 25. Windings 30 are distributed along the guideway 25 at various distribution densities, or at varying separation intervals, such density being determined by the desired control exercised over the vehicle speed in that region.

In order to conserve energy and to reduce exposure to pedestrians to the electromagnetic field generated by the windings 30 when excited, it is contemplated to include ahead of each segment or winding 30 a means for detecting vehicle proximity which acts to energize the adjacent winding 30 when tripped by the approaching train. More specifically, disposed adjacent and in front of each inductor winding 30 is a magnetic proximity sensor 35 which, conventionally, is responsive to the change in the magnetic circuit produced by the approach of a secondary 15. Proximity sensor 35 is tied at its output both to an error detector circuit 40 associated with each winding 30 and to a daisy chain circuit 45. Similarly, all other windings 30 are combined with such proximity detectors, each connected both to the display chain circuit 45 and to corresponding error detector circuits 40.

The error detector circuit 40, to be described in more detail below, produces signals on three signal branches, two of which are connected to a phase commutation circuit 55 and the third one, comprising a plurality of parallel leads, tied to a weight circuit 50. Accordingly, a control loop including error detector circuit 40, weight circuit 50 and phase commutation circuit 55 is associated with each inductor winding 30 in order to commutate the winding according to the deviation of the vehicle speed from a preselected velocity schedule.

Adjacent and ahead of each winding 30, the local speed of the vehicle is sensed by a speed trap circuit 60, such speed trap circuit comprising a conventional pair of photosensitive devices 58 and 59 which are interrupted in sequence by a projecting structure D extending from the vehicle. The speed trap circuit 60 produces two signals, L and T, separated in time to define a time aperture corresponding in duration to the vehicle velocity. This time aperture produced by the speed trap circuit 60 ahead of each winding 30 is connected to the input of the error detector circuit 40 which concurrently receives a clock signal C from a crystal referenced clock circuit 75. The crystal referenced clock circuit 75 also produces a phase jammed signal P which is phase referenced to a 60-cycle A.C. signal E commutated by the commutation circuit 55 to excite the associated winding 30 to an excitation level corresponding to the error detected by the error detector circuit 40.

Signal P is connected to the phase commutation circuit 55 which at the same time receives the output of the weight circuit 50, where the phase commutation circuit 55 commutates the A.C. signal E, exciting the linear inductor winding 30 according to the error sensed by the error detector circuit 40. In this manner, a control loop is formed around each winding 30, controlling the propulsive power generated by the winding according to the local speed error of the train.

The proximity sensor 35 output signal is logically combined in any desired train separation arrangement by the logical connections in the daisy chain circuit 45. The signal developed by the proximity sensor 35 is branched off and collected with the signals of the other proximity sensors in a daisy chain circuit 45. For convenience in illustration, the signal from sensor 35 is labeled as a signal X. The other sensors are respectively labeled $35_a$, $35_b$, $35_c$, etc., each producing an associated signal $X_a$, $X_b$ and $X_c$. Signals X, $X_a$, $X_b$ and $X_c$ are logically combined in circuit 45 such that the output signal thereof going to the winding immediately behind the winding 30 selected for illustration is a logical low or zero when signal X is high. In this manner, any selected number of adjacent proximity sensor signals can be disabled in order to achieve any desired vehicle separation.

The error detector circuit 40 is a time aperture measuring circuit, driven by a fixed, crystal referenced, clock signal C to produce pulse bursts which are proportional in count to the local speed of the vehicle. This count is then compared against a predetermined count and the difference is converted to phase commutation signals. The weight circuit 50 recodes the error count into a weighted count which is utilized in the commutation circuit 55 to provide equal power increments of commutation. When the maximum control authority of the commutation circuit is exceeded, the error detector circuit 40 produces a full forward or a full reverse signal directly to the phase commutation circuit 55, independent of any clock count above or below a given level. In this manner the error detector circuit and the commutation circuit approximates the conventional slew rate of a servomotor when utilized in a closed loop fashion.

As shown in FIG. 2, the crystal referenced clock circuit 75 includes a reference crystal 176 providing an electrical signal at a selected frequency of oscillations. The reference signal from the reference crystal 176 is branched to connect along one leg of the branch to one set of counters, shown by way of a single idealized ripple counter 177, which divides the crystal frequency down to any workable level of count repetition. Counter 177 in this example is configured as an idealized ripple counter connected at one of its more significant bit levels to a signal lead producing the repetitive count signal C which is also looped back to reset the counter. In this form, the counter 177 acts as a divide-by-$n$ counter reducing the oscillation frequency of the crystal 176 by a factor $n$ to a workable frequency. On the other branch leg the crystal 176 output signal is brought down to a second continuous running counter 180, similar to counter 177, across a D-type flip-flop 181 configured as a divide-by-2 flip-flop by looping the Q output thereof back to the D input. The connection of Q output to the D input converts the operation of the D flip-flop to that of a toggle (or a T flip-flop) with the inherent divide-by-2 characteristics thereof.

Counter 180 is again an idealized divide-by counter connected to the Q output of flip-flop 181 to reduce the pulse frequency thereof to some predetermined frequency which in this case is selected to approximate a repetition rate of approximately 1° intervals of a 60 cps A.C. signal. For purpose of this description, a 1° approximation is the smallest increment in the commutation of the winding 30; accordingly, counter 180 and flip-flop 181 are continuously running and require no synchronization with the A.C. frequency.

It is to be noted, however, that most commercially available crystal circuits operate at some fixed frequency which is not exactly divisible with 60 cps. For this reason, any integer accumulation of the 1° pulses described above will not always generate a precise 60 cps when divided down by 360. Accordingly, it is further contemplated within the present invention to provide a phase jamming feature in the clock circuit 75 which is referenced to a conventional 60 cps A.C. signal. The 60 cps A.C. signal is shown to originate from a source S producing an oscillatory signal E where the same signal E is used to excite winding 30. Signal E is connected to the clock circuit 75 across a phase detector circuit 185 to an isolation circuit 186 which is therefore synchronous and in phase with the zero crossings of signal E. The isolation circuit 186 further includes separate elements to be further described, splitting the positive and negative zero crossings according to phase to produce a separate set and reset signal respectively designated A and B. Signals A and B operate, in a conventional manner, a flip-flop 187 which in this instance provides the function of noise filtering and the like. The $\overline{Q}$ output of flip-flop 187 clocks a D-type flip-flop 188 which in turn is set at terminal S by the Q output of a flip-flop 189 connected at the clock input to the $\overline{Q}$ output of a flip-flop 181 in divide-by-2 sync with crystal 176. Flip-flops 188 and 189 act to synchronize the negative zero crossing, or signal B, with the $\overline{Q}$ output of flip-flop 181.

The Q output of flip-flop 189 is then connected to the clear terminal of a counter 190 which is series connected with counter 180. Counter 190 is connected to provide both a divide-by-6 and divide-by-360 and is periodically cleared in synchronism both with the $\overline{Q}$ output of flip-flop 181 and the Q output of flip-flop 189. The 1° output of counter 180 and the 6° and 360° outputs of counter 190 are combined to form the phase referenced signal P comprising respectively signal leads P1, P2 and P3 while the output of counter 177 provides the signal C. The counters 177, 180 and 190 can be conventionally configured to provide any desired count which in combination with the divide-by-2 function of flip-flop 181 will produce any convenient division scheme, re-jammed every 360° in the A.C. cycle by flip-flop 187. It is to be noted that counters 177, 180 and 190 are shown in FIG. 2 as generalized counters and are not illustrative of any counter available in the general market. While this illustration is considered fully sufficient, reference should be made at this point to the subsequent figures which, in detail, form such circuit from commercially available integrated circuit elements selected to operate in combination with a particular crystal, i.e., a crystal operating at 10 megahertz. Similarly, the illustration appearing in FIG. 2 is highly linearized in many other respects and again reference should be made to the subsequent specific examples for the particular details which are inherent in any manufactured circuits and which therefore may require additional connections which, while necessary for proper functioning of the selected elements, are not necessary to convey the operation thereof.

With the foregoing description of the clock circuit, a fixed, continuously running pulse train is developed, shown as signal C, which can be of any selected frequency. This signal serves as the count reference against which any error measurements are made in the error detector circuit 40.

As shown in FIG. 3, as a vehicle progresses along the guideway 25 towards a particular winding, the proximity sensor 35 is tripped by the change in the magnetic circuit which now includes the secondary, producing a signal transient on a signal lead designated X, according to means further described. The tripping of the proximity sensor 35, or the signal transient on signal lead X, sets two D-type flip-flops, respectively designated 141 and 142. Flip-flop 141 is again configured as a toggle by a $\overline{Q}$ to D feedback, thus operating as a divide-by-2. The clock signal of flip-flop 141 is connected to the 360° output of signal P, designated $P_3$, and the $\overline{Q}$ terminal is also connected to the input of a counter 143 to provide a filtering function based on a fixed count of cycles. In this manner, the gaps in a counter are ignored by the proximity detector circuit. Specifically, couner 143 carries into the clock input of flip-flop 142 and the $\overline{Q}$ output of flip-flop 142 is utilized as a clear signal Z which periodically clears the error detector circuit 40.

Immediately subsequent the tripping of the proximity sensor 35, the leading sensor of a speed trap circuit 60 is tripped by the vehicle passage, producing a signal transient on a signal lead L followed by the tripping of the trailing sensor to produce a signal transient on a signal lead designated T. Signals L and T are connected to the set and clear inputs of a dynamic flip-flop circuit designated 150. While the dynamic flip-flop circuit 150 is shown symbolically as one element in classical symbolic representation, it is to be understood that implementation thereof may require various circuit techniques which are specifically described herein by way of the subsequent detailed examples. The circuit 150 is shown in this instance with a conventional delay line 151 feedback sized to ring with the C signal frequency from the clock circuit 75. The result is that the signal C is passed as a pulse burst limited by the signal transients on the set and reset lines, i.e., between the transients on signal leads L and T from trap circuit 60. The pulse burst thus produced corresponds to the velocity of the vehicle over the trap measured in terms of the signal C pulse frequency and is accordingly designated as signal V, which is then connected to ripple through a counter 155, to convert the pulse train on the V signal into parallel form.

The binary counter 155 is again in this instance shown as an idealized counter connected at the input to the output of flip-flop 150. Counter 155 therefore accumulates the pulse burst of signal C passed through flip-flop 150 in the form of binary count to produce a parallel count output of which selected more significant bits *msb* are connected to a comparator 156. Counter 155 is furthermore a programmable counter receiving on the data input side of the *msb* terminals a fixed set of inputs preset to any selected count level by a conventional coding matrix shown as coding matrix 158. Coding matrix 158 therefore adjusts the velocity pulse count on signal V to a count compatible with a comparator 156, which is connected to compare the *msb* leads only. In addition, counter 155 develops a plurality of less significant bit signals designated *lsb* which are not directly tied to comparator 156 which at the other side receives a plurality of data leads from a patching matrix 157. Such less significant bit signals *lsb* develop a parallel count corresponding to the linear error range of the velocity deviation relative the reference velocity set in the reference matrix 158. Since the less significant bits *lsb* form fractions of the lowest more significant bit *msb* of counter 155 connected to comparator 156, the less significant bit leads *lsb* in effect duplicate the linear range of a servomotor operating between saturation limits defined by the low and high of the lowest bit in the *msb* leads.

Thus, the less significant bit leads *lsb* develop a count remainder which is a direct measure of the residue of the time count developed by the signal C passed through flip-clop 150.

It is to be noted that the count developed in the *lsb* leads is in equal increments of time, or in terms of a pulse train of a fixed frequency as developed on signal C. If converted directly as time increments of commutation, the resulting control function would necessarily be nonlinear since the signal commutated is a sinusoidal waveform switched to excite the primary winding 30. Accordingly, the *lsb* leads are connected to a weight matrix 50 which, in a conventional manner, converts the count to a weighted count assigning a larger commutation increment for the sine wave regions which provide lower torque or power increments. Such weighting function is shown in graphical form in FIG. 15.

Comparator 156 is enabled at a time when the error count in counter 155 is stabilized. For this purpose, a shift register 144 is included in FIG. 3 connected to be enabled by signal Z and shifting out the number of cycles of signal $P_3$. A selected output terminal of register 144 is connected as a signal G to the enable input of comparator 156.

It is to be noted again that the embodiment described in FIG. 3 utilizes ideal components and does not necessarily refer to any physical limitations whch conventionally appear in any available digital logic circuit elements. It is therefore necessary to refer to the embodiments shown subsequently for specific implementations thereof.

Comparator 156 generates in a conventional manner three output signals designated as a signal bunch LEG which includes signals A < B, A=B and A > B, the A and B convention being maintained in this instance in conformance with the convention practiced in the art. Signals A < B and A > B are directly combined with signal $P_3$ in respective AND gates 163 and 164 in FIG. 4 and the respective outputs of gates 163 and 164 are then tied to the gate terminals of two silicon controlled rectifiers (SCR's) 165 and 166 connected in opposing bias in the excitation lead carrying signal E in winding 30. In this manner, full forward and full reverse commutation is accomplished.

It is to be noted that the above full forward and reverse commutation scheme is shown as a highly idealized circuit and therefore such circuit will not be shown with direct correspondence in the subsequent examples.

Furthermore, while additional gating logic is used in the subsequent examples to expand the accuracy of the less significant bit signals lsb by taking the less than output of the comparator 156 and adding one more minimum digit to it, the invention may be explained by reference to a simplified configuration shown in FIG. 4 wherein the less significant bit signals are directly connected to a register 160. The outputs of register 160 are then connected to an encoding matrix 161 which, in this instance, is shown as an encoding matrix formed by a ROM device. Matrix 161 is in turn enabled by signal A=B and is gated by signal G. The plural lead output from the ROM device or matrix 161, converted through the encoding process contained therein, are then input to the respective preset lines of a shift register 162 which is set to shift out the 1° pulse signal $P_1$ upon receiving the 360° transient or signal $P_3$ of the signal bunch P. The output of the shift register 162 is then directly tied to the gate terminals of SCR's 165 and 166 which then commutate the 360° signal E to the winding 30, according to the time aperture passed by shift register 162.

From the above description, it should be clear that the system disclosed can best be described as falling into the class terms of sampled data control systems. The periodic characteristics of the control applied also exhibit behavior similar to that of a contactor or on-off control system. The contactor characteristics of the system, however, are somewhat permutated since linear control is available through the linear commutation provided when signal A=B is issued from comparator 156. Accordingly, the general problem of contactor systems, i.e., the characteristic deadband and the associated limit cycle is avoided. In a pure contactor system control, corrections will not issue until the system error exceeds the deadband. Without additional limitations such control system tends to limit cycle at a period frequency typically determined by the overall gain of the system and the size of the deadband. A cyclic conditin of this kind is not pleasant to the occupants of the train, is less accurate in any stationing operations and more frequently exercises full power of the control system resulting in a large wear index with the attendant maintenance problems. All these problems are avoided by the inclusion of the linear region described hereinabove in the control loop. In addition, since the phase commutation is linearized, very predictable response characteristics can be developed through the use of this system since the overall system gain during any sampling interval does not vary significantly with amplitude until saturation is reached. Furthermore, incorporation of selectively activated windings 30 through the use of the proximity sensors allows for any convenient sampling rate selection within the speed region of the train. Any error stack up due to the sampling rate can be selected to fit into the control authority region by the simple expedient of distribution density of windings. Furthermore, the encoding function in the ROM matrix 161 can be modified to select any convenient gain level compatible with the dynamics of motion of the vehicle. Thus, the system is both adjustable in sampling rate and the gain per sample, utilizing all of the benefits of a contactor device while not sacrificing any of the errors associated therewith. All these features are particularly adapted to a public carrier system.

By way of the example shown in FIG. 5, logical interconnection is possible between the adjacent windings 30 by interconnecting the proximity sensor output signals designated in this instance as $X_a$, $X_b$, $X_c$, the subscripts *a*, *b* and *c* indicating adjacent proximity sensors $35_a$, $35_b$ and $35_c$. Signals $X_a$, $X_b$ and $X_c$ are collected at an OR gate 250 and when any one or more thereof indicates the presence of a vehicle over the designated proximity sensor, OR gate 250 will issue a logical "1" according to the conventional Boolean OR. In addition, there is shown the signal X from sensor 35 which is collected with the OR gate 250 output signal at the input of a NAND gate 251. The output of NAND gate 251 is then combined with the X signal in an AND gate 252 which then passes the proximity sensor output signal X.

It is to be noted that while this example is limited in the number of combinations made, further combinations can be implemented depending on the separation wanted and the overlap desired between vehicles. This chain of circuit connections is repeated on each winding stage with more or less patching such that either larger or smaller separation intervals are accomplished.

In the foregoing description, it is to be noted that no particular reference was made to any synchronization of the inductor switching time or the inductor commutation relative the position of the secondary 15. While various synchronization techniques are possible, it is convenient for the purposes of this example to consider an oversized secondary 15 in comparison with the dimensions of the winding 30. Since the secondary in a linear motor is a passive device, only very coarse synchronization is necessary of the inductor winding 30 relative the secondary. Such can be conveniently made by the positioning of the proximity sensor 35 relative the associated winding 30 at some integer separation measured in increments of the A.C. cycle of the signal E. In the examples above, the circuit shown in FIG. 3 includes the register 144 which is clocked according to the 360° artificially generated phase signal on lead $P_3$ of the signal bunch P. The $\overline{Q}$ output of flip-flop 141 is then counted up in the register 144 for any convenient integer count in order to develop signal G. Signal G therefore is the synchronization signal clocking counter 155 and comparator 156. Similarly, signal $P_3$ is the clear signal in FIG. 4 for the shift register 162 such that the commutation signal made to the winding 30 occurs both in phase with signal E and at the time when the oversized secondary 15 is located adjacent the winding.

With the foregoing description, it should now be apparent that the configuration described can be accomplished in many ways. This is particularly true since conventional logic elements are used throughout the system. All adjustment of gain, synchronization and local speed can be performed externally by patching and speed trap geometry without any requirement of common clock and without any analog to digital conversion of local signals. Accordingly, since the measure of speed by way of time increments can be set to accommodate any clock frequency by the simple expedient of the speed trap dimensions, any LSI computation system using an internal clock can be adpated for this purpose.

Figure 6:
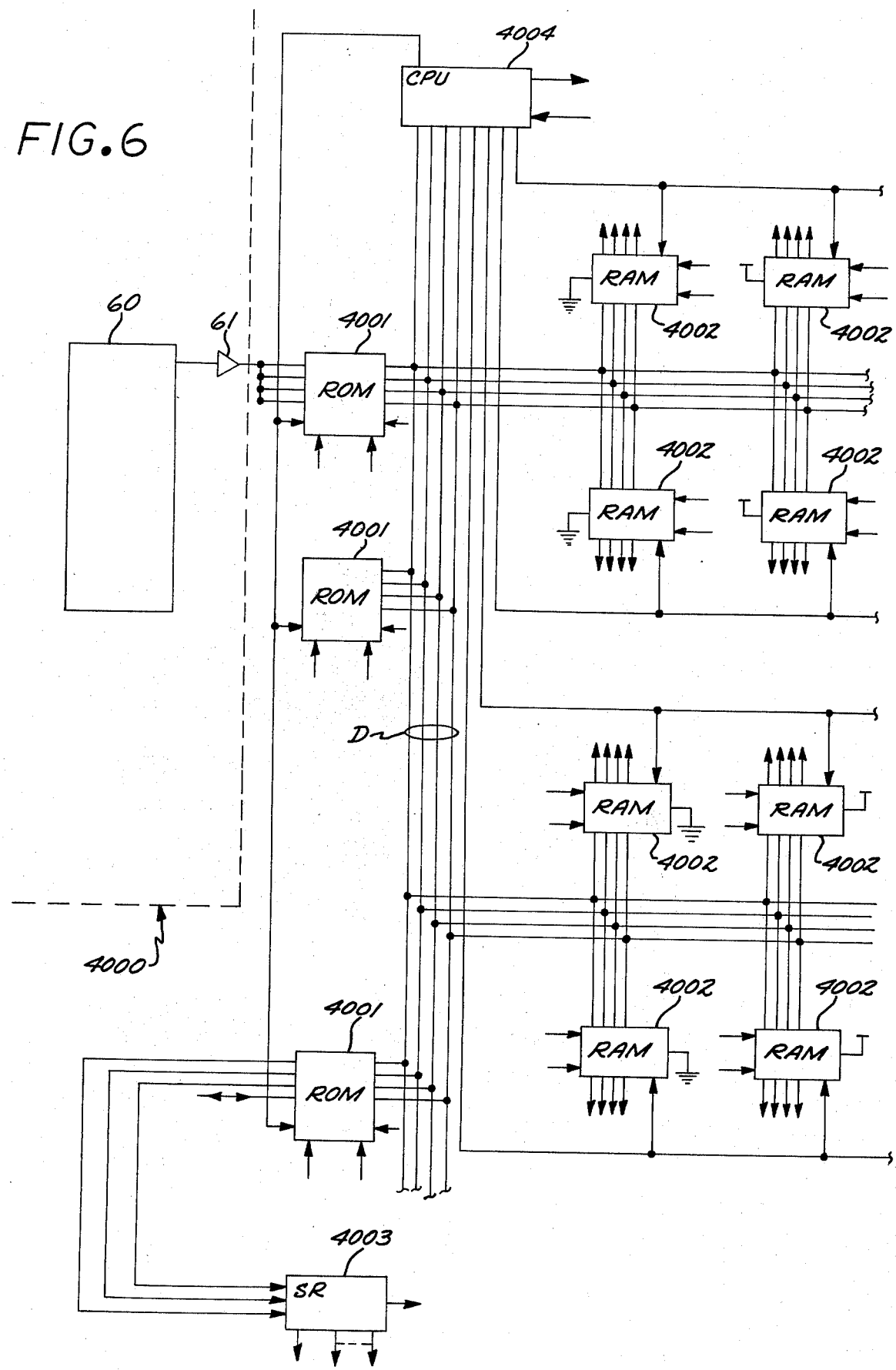
FIG. 6 is a diagram illustrating another embodiment of the control system shown in FIG. 1.

One particular example of a processing system is the microprocessor produced by the Intel Corporation under the Model No. MBS-4. For convenience of description, reference is made to FIG. 6 wherein such a microprocessor 4000 is shown including elements having the same designating numerals as utilized in the description of the processor by the manufacturer. In a processor of this kind, data is transferred in and out by time multiplexing of four data bus lines, shown as lines D. The timing is internally generated according to a clock of relatively high frequency and the routine thereof is synchronized by a sync signal supplied by a central processing unit (CPU) 4004. The central processing unit 4004 also includes a four-bit adder, an index register and a program counter and stack, where the operation of these elements controls the input-output sequence. The program counter and stack includes an incrementer which conventionally increments the address, in this case the reference being made to an address of an input-out read only memory ROM designated 4001. It is to be noted that the incrementing feature is performed according to a relatively fast clock, i.e., a clock utilizing clocking apertures of 0.75 Megahertz either in combinations of three or two counts depending on the control function performed, such that any incrementing of an address to an ROM will occur at a frequency much higher than that necessary to approximate 20 Kilohertz (approximately 360 × 60CPS = 1° increment). In this instance, the speed trap circuit 60 is input through an external flip-flop, shown as the flip-flop equivalent of circuit 60 in FIG. 3, which gates the Q output to a selected plurality of input leads to the first ROM 4001. It is to be noted that the logic convention utilized in the microprocessor 4000 is negative logic while the logic of the circuit 60 may be positive logic. Accordingly, an inverter unit 61 is inserted between the Q output of circuit 60 and ROM 4001 to approximately match the polarity. Furthermore, more than one inverter 61 may be connected in parallel in order to match signal loading, should such be required.

In the example set forth above, i.e., the microprocessor 4000 selected, each ROM chip designated 4001 includes elements forming a four-bit input-output port. When operating in the input-output mode ROM 4001 routes in I/0 data received from circuit 60 according to any program instructions selected. The routing of data through the respective ROM chips allows for the simple expedient of incrementing via the internal clock of the microprocessor in order to achieve an arithmetic count. Thus based on a particular instruction cycle, the contents of the accumulator section may be made to contain at the end of any particular trap interval a count which represents the duration of on-time of circuit 60. The accumulator contents can then be transferred out into the random access memories RAM available for that purpose, i.e., 4002, then transferred upon a subsequent sync signal to a further ROM 4001 which in this instance is connected as the weight circuit 50. The last ROM 4001 is then shifted out to a RAM 4002 by applying a branching instruction through the test signal to the central processing unit 4004 and enabling a shift register 4003 thereby. Shift register 4003 then can be utilized in a similar manner to provide the proper commutation of the signal to the winding 30. It is to be noted that in this instance the test signal is an external signal which can be conveniently synchronized with any squared 60-cycle A.C. signal such as the signal E shown hereinabove and furthermore the encoding function in the last ROM can be adapted to match the internal clock or to synchronize the internal clock with the 60-cycle input.

From the above example, it should be apparent that an arrangement is possible wherein the functions described hereinabove in terms of small scale integrated circuit elements are duplicated in a commercially available microprocessor. It is to be noted that the only restriction on a microprocessor is that it be clocked or that it operate at a bandpass including the minimum increment freuqency of the commutation of signal E, or a clock speed significantly higher than the 1° repetition frequency of a 60-cycle signal.

As shown, the processing unit 4004 is provided with an external input designated "reset" which when excited will clear the whole microprocessor to initial state. This reset condition can be achieved by pulling off the signal from the proximity sensor 35 through a NAND gate for inversion, in this instance designated NAND gate 1002. It is to be noted that in this example no specific reference has been made to the comparator function of comparator 156. Such should be clearly apparent by inspection of the data sheets on the Intel MCS-4 microprocessor which includes the requisite instruction sets to carry out the necessary comparison, the conditional jumps and any other functions required to provide the comparison. For example, by encoding in the accumulator group instructions the input OPA as an 0010 an incremental accumulation can be performed which is equivalent to the dynamic flip-flop circuit 150 shown in FIG. 3. Furthermore, by encoding 1000 a decrement accumulation sequence can be carried out.

The above example is therefore conventional in all respects and is operative primarily due to the internal clock speed or internal instruction execution speed of the microprocessor relative the commutation speed required for control.

At this point, a detailed description of the circuits shown in FIGS. 1–5 will be undertaken. It is important to note that the following description illustrates one specific embodiment only and is shown for the purpose of teaching one skilled in the art a practical assembly which will operate when properly connected. More specifically, the detailed description refers to the functional schematics shown in FIGS. 2–5, implementing such schematics by introducing presently available integrated chips in appropriate connections.

Figure 7:
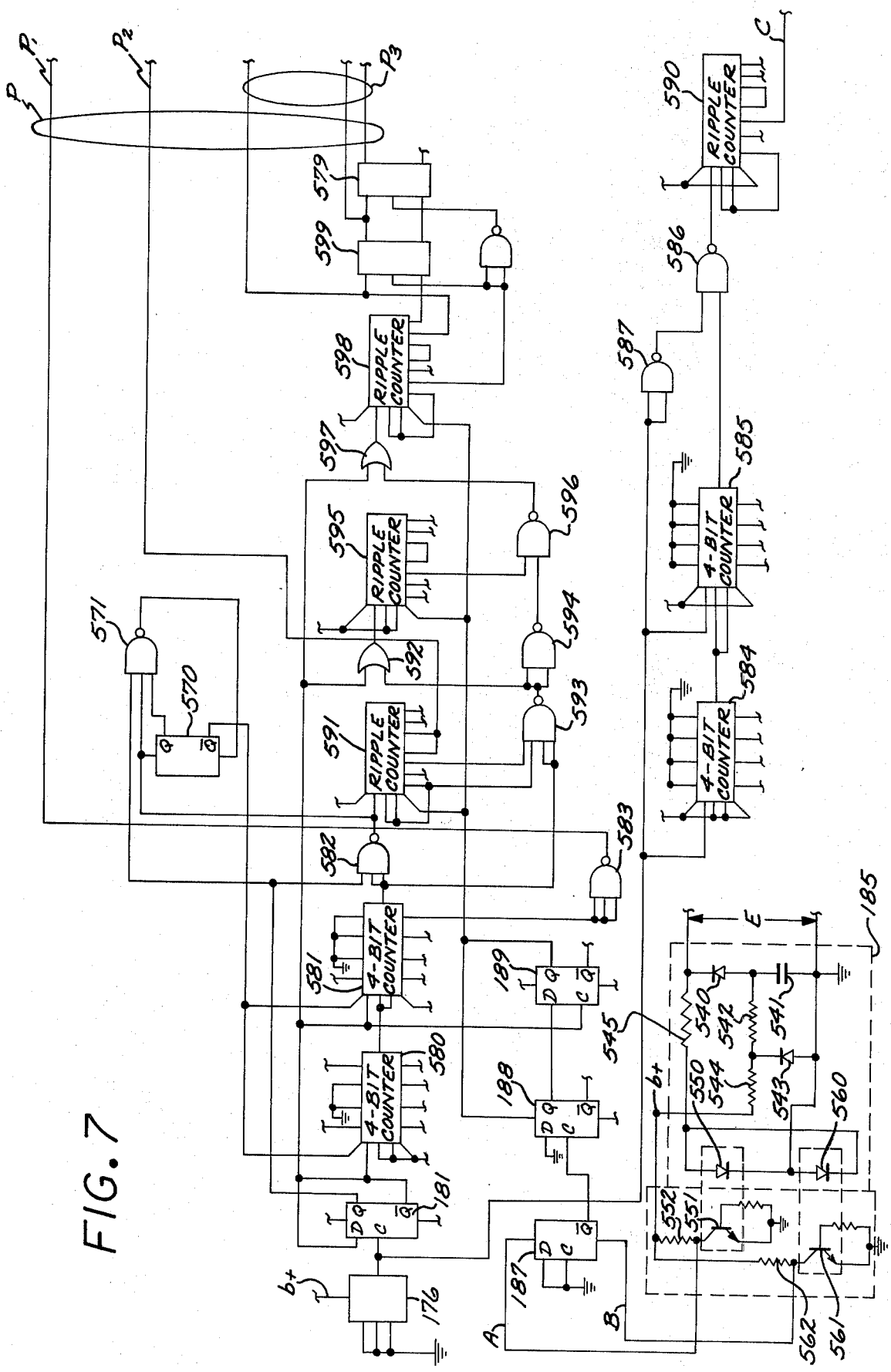
FIG. 7 is a circuit diagram illustrating one practical embodiment of the idealized circuit of FIG. 2.

As shown in FIG. 7, the functional embodiment of FIG. 2 can be reduced to a practical circuit by the following connections of available element. Crystal 176 in this instance has been selected as a 10 Megahertz crystal, such as the crystal produced by Monitor Products, Inc., under the Model No. 969. In this configuration, chip pins 2, 3 and 10 are connected to ground while pin 5 is connected to the 5-volt reference b+. The number 1 pin output of the crystal chip 176 is connected to the clock input of a Texas Instruments Model No. 7474 D-type flip-flop which is a conventional TTL logic flip-flip designated in FIG. 2 as flip-flop 181 and which connects at the $\overline{Q}$ output to the number 2 terminal of a Texas Instruments Model No. SN74161 Synchronous Four-Bit Counter designated as counter 580. It is to be noted that in this instance counter 580 comprises one stage of the idealized counter 180, it being further clarified below that while counter 180 was shown as an asynchronous or a ripple counter, the preferred practical application is to use synchronous counters for this purpose. As anyone skilled in the art will know, a counter of this type may be preset to any count level by proper patching of data inputs. More specifically, the chip terminals 3, 4, 5 and 6 can be patched in any conventional manner in order to preset the outputs at terminals 13, 14, 12 and 11. In this configuration, terminals 4 and 5 are shown pulled to ground with a resulting preset. The carry output of the counter 580 is connected to a second, cascaded counter 581 which is similarly constructed as counter 580 having terminals 4, 5 and 6 pulled to ground. At the same time, counter 581 also receives at the clock terminal, the $\overline{Q}$ output of flip-flop 181. In this manner, the combination of counters 580 and 581 forms conventionally an eight-bit counter which can be pre-programmed by appropriate patching of the data input terminals to any convenient count level. The carry output of counter 581 is then pulled off to a NAND gate 582 which also receives at the input thereof the Q output of flip-flop 181. NAND gate 582 is again selected as a Texas Instruments Model No. AN7410 NAND Gate which is a conventional TTL NAND gate sinking current at three terminals. In this manner, the NAND gate operates as a triple input NAND. Similarly, the highest significant bit of couner 581 is pulled off in common to the three inputs of a NAND gate 583, NAND gate 583 being configured in an identical manner as NAND gate 582. The output of NAND gate 583 is therefore the continuous running 1° increment count of the signal branch P, i.e., signal $P_1$.

In a similar manner, the reference clock signal C is developed from the output of the crystal 176 by an $n$-bit counter connection comprising counter 584 and 585. Counters 584 and 585 are again Texas Instruments Model No. SN74161 type counters connected as an $n$-bit counter similar to the connection of counters 580 and 581. Counters 584 and 585 are patched in on the data terminals as conventional four-bit or divide-by-16 counters with the carry of counter 584 enabling counter 585. Accordingly, a combination of the two counters provides a divide-by-256 of the 10 Megahertz signal from the crystal 176. The carry output of counter 585 is collected at one input of a NAND gate 586, the other input thereof being the inverted output of the crystal 176. More specifically, the crystal output in this instance is also inverted through a NAND gate 587. NAND gates 586 and 587 are conventional NAND gates shown by reference to the Texas Instruments Model No. SN7400. The output of NAND gate 586 then is passed to the input of a conventional ripple or divide-by counter 590.

Counter 590 will now be described in detail and the description thereof will be relied on for the counters behind counters 580 and 581. More specifically, counter 590 has been selected as a Fairchild counter, Inc. counter Series No. 9305 Variable Modulo Counter, internally interconnected to provide a divide-by counter. Counters of this type can be selectively configured to any count length desired by feeding back, or patching in, the particular count level into the clear and reset terminals. Thus two integer manipulations are possible and in this instance by patching back terminal 9 to terminals 3 and 4 and bringing out terminal 5 of the counter, 153.6 cps frequency can be developed at the output. This frequency is therefore the signal C frequency utilized to clock the speed through the speed trap circuit 60.

Similarly, the output signal from NAND gate 582 is fed to the input of a ripple counter 591 which is similarly constructed to the counter 590. Ripple counter 591 furthermore is synchronized or periodically reset with the zero crossing of the signal E. This reset feature will be described in more detail hereinbelow. The output of the ripple counter 591 set in this instance as a divide-by-6 provides a 6° pulse train in the signal bunch P, i.e., specifically a signal $P_2$. At the same time, a specific integer terminal of counter 591 is pulled down in combination with a divide-by-6 integer and the carry output of counter 581 to a NAND gate 593. NAND gate 593 is again a Texas Instruments NAND Gate Model No. SN7420, i.e. a four-emitter NAND gate. The output of NAND gate 593 is collected together with the $\overline{Q}$ output of flip-flop 181 at the input of an OR gate 592. OR gate 592 is similarly a Texas Instruments unit, specifically SN7432. The output of OR gate 592 is pulled off to the clock input of yet another ripple counter 595 which is again cyclically reset by the square wave function approximating the zero crossings of the signal E. Counter 595 outputs through a selected integer lead to a NAND gate 596, again a Texas Instruments SN7400 NAND gate which at the other input receives the inverted output of NAND gate 593. More specifically, NAND gate 593 is inverted through SN7400 NAND gate 594. The NAND gate 596 output is again collected with the $\overline{Q}$ output of flip-flop 181 in an OR gate 597 to be passed to a ripple counter 598 again a Fairchild Semiconductor Model No. 9305. Selected integer leads from counter 598 input to a JK flip-flop 599, Texas Instruments SN74107, in order to produce the artificial zero crossings as determined by the count. It is to be noted that in this instance a three-phase artificial signal is produced by appropriate divide-by-60, or 60°, count which through a second flip-flop 579 can be counted up or extended to the 120° intervals necessary for three-cycle or three-phase 60-cycle A.C. signal.

As referred to hereinabove, counters 591, 595 and 598 are periodically reset in synchronism with the zero crossings of the actual 60-cycle signal E. More specifically, such is accomplished by the phase detection circuit referred to hereinabove, i.e., circuit 185, which through optical coupling produces a signal out of the isolation circuit 186, signals A and B to the flip-flop 187.

Flip-flop 187 in this instance is again a D-type flip-flop receiving the signals A and B at the preset and clear terminals and connecting at the $\overline{Q}$ output to the clock input of the flip-flop 188. The Q output of flip-flop 188 is in turn connected to the D input of flip-flop 189 which is clocked by the $\overline{Q}$ output of flip-flop 181. The Q output of flip-flop 189 then provides the periodic or the cyclic reset and clear signal to the above-mentioned counters. Flip-flops 187, 188 and 189 are typically Texas Instruments Model No. SN7474; in addition, the load terminals of counters 580 and 581 are pulled off from the $\overline{Q}$ output of a flip-flop 570 which again is an SN7474 flip-flop receiving at the preset terminal the output of NAND gate 582 and at the clear terminal the output of a NAND gate 571. NAND gate 571 furthermore receives at the input the Q output of flip-flops 181 and 570, as well as the output of NAND gate 582. Accordingly, the combination of NAND gate 571 and flip-flop 570 forms a conventional ripple carry circuit for the continuous running of counters 580 and 581.

By way of one example, signals A and B out of isolation circuit 186 are developed in the following manner. Specifically, signal E is received in the phase detector circuit 185 with the positive terminal being connected both to the cathode of a diode 540 and to the resistor 545 which is attached to the anode of a light-emitting diode 550 and cathode of a light-emitting diode 560. The negative terminal of signal E is in turn connected across a capacitor 541 to the anode of diode 540 and from there across a resistor 542 to both the cathode of diode 543 which at the anode connects to the return terminal of signal E and to one end of resistor 544. Resistor 544 receives the 5-volt or the $b+$ voltage setting the D.C. forward bias level for phase monitoring. The anode of diode 543 furthermore connects to the cathode-anode junction between diodes 550 and 560. Diodes 550 and 560 are included internally in optical coupling devices such as the Motorola Series No. MOC-1000 which at the other end include light sensitive transistors 551 and 561. Transistors 551 and 561 are configured in common emitter connection referenced to the voltage $b+$ across appropriate collector resistors 552 and 562 and are rendered conductive upon the light emissions from diodes 550 or 560. The collector signals of transistors 551 and 552 therefore become respectively signals A and B to the flip-flop 187. For purposes of description, the above referenced circuit has been previously designated as the isolation circuit 186.

From the foregoing description, one specific implementation of the inventive concept is hereby shown wherein two discrete signals are developed, one producing a continuous running pulse train as the signal C while the other one producing two pulse trains, one periodically reset and one continuous running as the signals $P_1$ and $P_2$ of the signal branch P. At the same time, an artificial phase signal is developed on the integer combination of the signals $P_1$ and $P_2$, i.e., the 360° phase signal referred to hereinabove as signal $P_3$.

Figure 8:
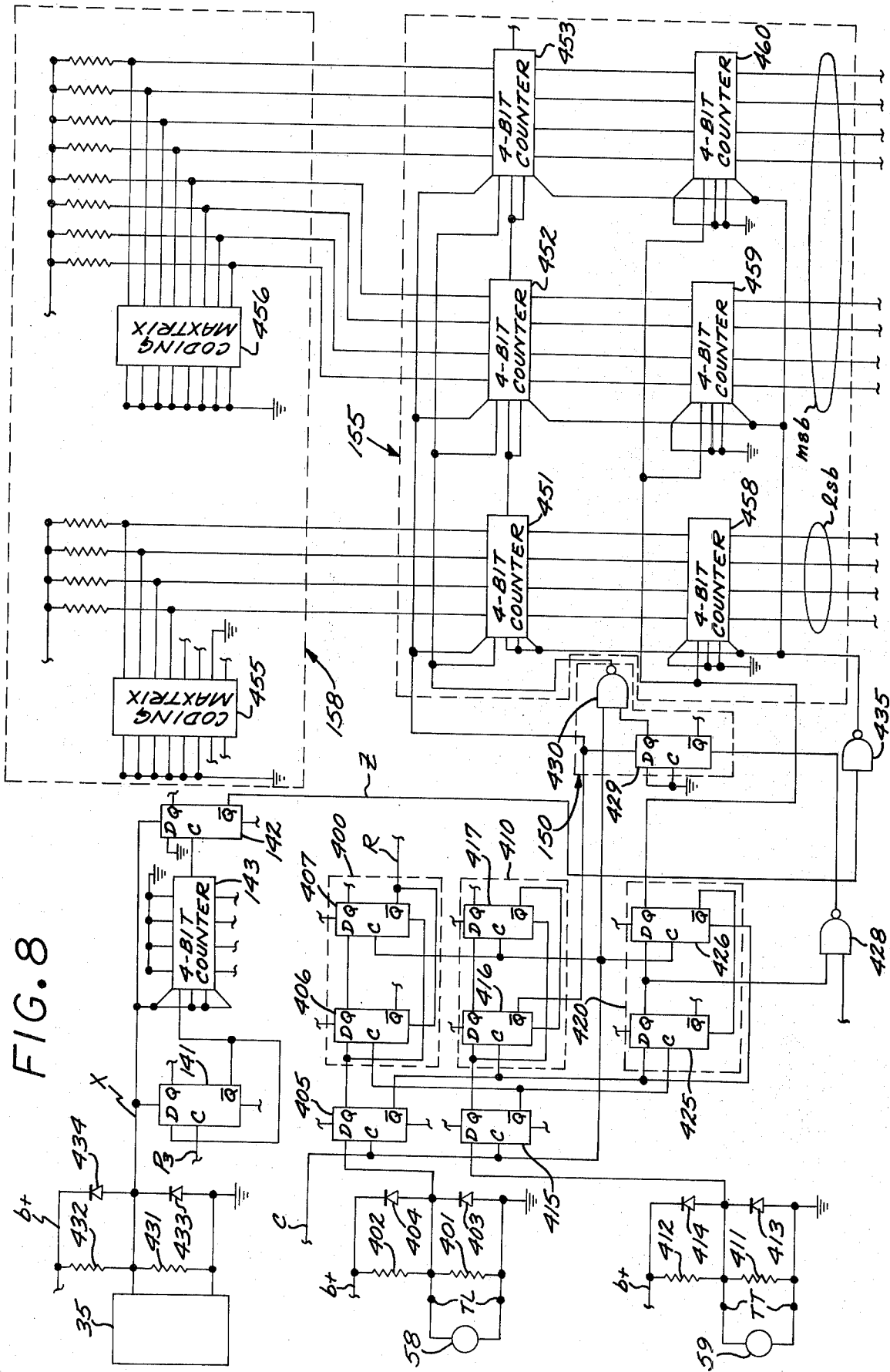
FIG. 8 is a circuit schematic illustrating one practical embodiment of the idealized circuit shown in FIG. 3.

The error detector circuit 40 is more specifically described by way of reference to FIG. 8 wherein one practical embodiment is shown utilizing conventionally available IC chips. More particularly, the signal developed by a leading and trailing edge photo sensor, respectively designated 58 and 59 is picked off across terminals TL and TT respectively. Signal TL is connected across a lower resistor 401 of a voltage divider which in the upper leg includes resistor 402 connected to the voltage $b+$. A diode 403 is placed in parallel across resistor 401 and in series with a diode 404 across resistor 402. The cathode-to-anode junction between diodes 403 and 404 is pulled off to the D terminal of a D-type flip-flop 405 which at the clock input recieves the signal C. Similarly, the trailing edge photo sensor 59 is connected across a lower resistor 411 which with an upper resistor 412 forms a voltage divider having aprallel diodes 413 and 414 thereacross. The common junction between diodes 413 and 414 is then again pulled off to a D-type flip-flop 415 at the D terminal which also receives at the clock terminal signal C. Flip-flops 405 and 415 are conventional Texas Instruments flip-flops designated under the Model No. SN7474. The true or the Q output of flip-flop 405 is pulled off both to the D input of a flip-flop 406 and to the clear terminal of a flip-flop 407, where flip-flops 406 and 407 are similarly constructed as flip-flop 405. The clock input of flip-flop 406 is in turn the $\overline{Q}$ output of flip-flop 415 while the clock input to flip-flop 407 is the signal C developed by the timing circuit 75 (FIG. 1). In this configuration, flip-flop 405 is synchronized or clocked by the signal C either positive or negative going transient. Accordingly, the Q output of the flip-flop synchronizes the clear terminal with the signal C thus overriding any system lags or any circuit lags. The $\overline{Q}$ output of flip-flop 407 is furthermore synchronized again with signal C such that flip-flop 406 is periodically cleared, again in a synchronized manner. The circuit behind flip-flop 415 is connected in a similar manner by the proper interconnections between the clear, the Q and the $\overline{Q}$ terminals of flip-flops 416 and 417. Again, the Q output of flip-flop 415 connects to the D input of flip-flop 416 which in turn at the Q connects to the D of flip-flop 417. The $\overline{Q}$ of flip-flop 417 clears flip-flop 416 which in turn at the $\overline{Q}$ thereof produces the load signal to the error counter to be described below. Flip-flop 415 is clocked again by signal C as well as flip-flop 417. Flip-flop 416, however, is clocked by the $\overline{Q}$ of flip-flop 405 to synchronize therewith.

The $\overline{Q}$ outputs of flip-flops 405 and 415 are respectively connected to the D and the clock input terminals of a flip-flop 425 which at the Q output connects to the D input of a flip-flop 426. Flip-flop 426 is again clocked by signal C, being tied to the D input of flip-flop 425 at the clear terminal. The $\overline{Q}$ output of flip-flop 426 is again fed back to clear flip-flop 425. Accordingly, flip-flops 406, 407, 416, 417, 425 and 426 are connected in identical circuits herein referred to as circuits 400, 410 and 420, respectively. Circuits 400, 410 and 420 combine the three nontrivial modes of output of flip-flops 405 and 415. The configuration formed is commonly referred to as a master-slave flip-flop configuration which is set to pass single output pulses of some fixed width. The width of the pulse is characteristically identical to the width of the signal pulse on signal C.

The Q output of flip-flop 426 is used to produce a speed load pulse to be utilized according to the description hereinbelow. At the same time, the Q output of flip-flop 425 is pulled off to one input terminal of a NAND gate 428 which also receives at its other input an inverted C signal. The output of NAND gate 428 is connected to the clear terminal of a D-type flip-flop 429 which at the pre-set terminal receives the $\overline{Q}$ output of flip-flop 416. Flip-flop 429 is therefore operated as an asynchronous device which at the Q output depends in state on the particular input combination of NAND gate 428 and $\overline{Q}$ output of flip-flop 416. The $\overline{Q}$ output of flip-flop 429 is connected to one input terminal of a NAND gate 430 which also receives at the second input thereof the signal C. Since NAND gate 430 therefore depends on the lead-lag differential through the speed trap, it performs the function of the dynamic flip-flop described in circuit 150. The output of NAND gate 430 is the signal V or the clock burst indicating a duration of the train over the speed trap, i.e., indicating the local speed of the train. This clock burst signal, developed out of NAND gate 430, is fed in parallel to the clock of three four-bit counters respectively designated 451, 452 and 453. The load terminals of counters 451, 452 and 453 are tied to the preset of flip-flop 429 and at the same time to the $\overline{Q}$ of flip-flop 416. Counters 451, 452 and 453 are again synchronous, binary counters such as the Texas Instruments Counter, Model No. SN74161, while all of the flip-flops designated as D flip-flops are conventional Texas Instruments Model No. SN7474 flip-flops. The NAND gates referred to in this part of the description are SN7400 NAND gates, again produced by Texas Instruments.

Counters 451, 452 and 453 are interconnected in a cascade to form an $n$-bit counter which is capable of being programmed to any desired count.

More specifically, the data inputs of counter 451 are tied to an encoding matrix 455 which may be any diode matrix or any patching board through which external patching connections can be made in order to effect any desired data input to counter 451. Similarly, the data terminals of counters 452 and 453 are connected to a coding matrix 456 for appropriate data preset, where matrices 455 and 456 combine to form the above-described idealized matrix 158.

The outputs of counters 451, 452 and 453 are synchronized with the trailing edge pulse produced by circuit 410 through yet another parallel combination of counters respectively designated 458, 459 and 460. Counters 458, 459 and 460 are identical in all respects to counters 451, 452 and 453 except that they do not form any cascade interconnections, thus acting in this instance as conventional buffers by receiving at the data inputs the corresponding outputs of the counters 451–453. The buffer action is synchronized to the speed load signal of flip-flop 426 by the parallel connection of the pulse developed thereat to the corresponding clock terminals thereof. At the same time, counters 458, 459 and 460 are tied at the clear and load terminals thereof to the signal Z developed by the proximity detector circuit, i.e., to the $\overline{Q}$ terminal of flip-flop 142. In this manner, the counters are repetitively cleared at the completion of the passage of each train at the expiration of the count developed in the delay circuit or one shot behind the proximity detector. The respective output signals of counters 458, 459 and 460 therefore develop in parallel the count corresponding to the time duration within the speed trap of the train.

The output terminals of counters 458, 459 and 460 therefore provide, from left to right, a least significant to most significant coded binary bit output corresponding to the pulse burst accumulated within the duration of the trap. As referred to in FIG. 3, counters 451, 452 and 453 in combination with counters 458, 459 and 460 form the idealized counter 155. For convenience in identification, the idealized counter was shown in FIG. 3 as producing a group of parallel signals designated *msb* (more significant bits) and another group of parallel signals designated *lsb* (less significant bits). Coding matrices 455 and 456 in turn correspond to the idealized matrix 158 of FIG. 3.

As has been previously stated, the more significant bit signal leads *msb* set the control authority or the saturation plus and minus limits within which the linear control over the vehicle is exercised. The commutated or linear control is exercised according to the count developed on the least significant bits. The correspondence in this instance is set out such that the output terminals of counters 459 and 460 correspond to the more significant bits (*msb*) and counter 458 corresponds to the less significant bits (*lsb*).

Counters 458, 459 and 460 are essentially operating as buffers depending on the status signal from flip-flop 426. The data output from these counters is therefore appropriately an output corresponding or concurrent with the pulse output from circuit 420. Circuit 420 in turn is selected to respond upon a proper combination of $\overline{Q}$ outputs of flip-flops 405 and 415, flip-flops 405 and 415 respectively registering the signal transients across the leading edge and the trailing edge sensors 58 and 59 of the speed trap. Since circuit 420 at flip-flop 425 is set by the leading edge photo sensor 58, complementing $\overline{Q}$ of flip-flop 405, and is clocked by the trailing edge complement of flip-flop 415, flip-flops 405 and 415 being synchronized with the clock signal C, the output of this circuit, which incidentally is the output of flip-flop 426, determines the pulse length out of circuit 420, corresponding to a one clock pulse length at the return or at the switching transient across resistor 411. Accordingly, only after the speed trap is passed by the vehicle will the counters 458, 459 and 460 be enabled. Counters 458, 459 and 460 are furthermore cleared periodically or within a bit interval developed by counter 143. More specifically, counter 143 is clocked by the $\overline{Q}$ output of flip-flop 141 which as described above is a divide-by-2 flip-flop clocked by the 360° signal $P_3$ of the signal branch P. Flip-flop 141 is connected at the preset terminal to a proximity detector circuit comprising resistors 431 and 432 in parallel with diodes 433 and 434 respectively which is hooked across the proximity sensor 35. The signal developed between diodes 433 and 434, similarly to the prior described diode circuits, is the signal X of the proximity detector previously described. The signal X presets a flip-flop 142 which at the $\bar{Q}$ terminal produces the signal Z inverted by the NAND gate 435 to the clear terminals of counters 451, 452, 453, and 458, 459 and 460.

As shown in FIGS. 9 and 10, both the *lsb* and *msb* signal leads are appropriately decoded in the following manner. By way of the illustration shown in FIG. 9, the *msb* signal leads from counters 459 and 460 are fed to corresponding four-bit adders 469 and 470, respectively. Adders 469 and 470 are conventional four-bit binary adders such as the added Model No. SN7483 produced by Texan Instruments. In this configuration, the addend terminals of the adders 469 and 470 are tied to the *msb* data leads. The augend terminals are in turn grounded. The two adders are connected in the normal manner of an *n*-type adder by interconnecting the carry output, and the data outputs of the adders are then brought down in parallel to the data inputs of two comparators, respectively 471 and 472. Comparators 471 and 472 are again conventional comparators such as the comparator 9324 produced by Fairchild Semiconductor. Comparator 471 is connected at the *b* or the second inputs to a patching matrix 473 which allows for further adjustment of the coarse speed reference within the region of the speed trap. Comparator 472 has the *b* leads tied to ground and it is essentially therefore comparing against "0". The *a*-greater-than-*b* terminal of comparator 472 is again inverted through NAND gate 476 to connect to the clear terminal of flip-flop 475. The $\bar{Q}$ output of flip-flop 475 is recirculated to the input of adder 469 in order to increment the adder by one lowest significant bit if the *a* inputs to the series connected comparators is greater than the *b* inputs or the inputs from the patching matrix 473. The combination of comparator 472 and flip-flop 475 effects a latch which will stay either in a Q or the $\bar{Q}$ state unless the comparator output of *a*-greater-than-*b* reverts to an output of *a*-less-than-*b* within the recirculation period of add one previously described. The Q and $\bar{Q}$ outputs are respectively pulled off to two corresponding NAND gates 477 and 478 which at the other inputs also collect the *a*-greater-than-*b* signal from comparator 472. The output signals of NAND gates 478 and 477 are respectively collected with the output signals of NAND gates 476 and 474 in corresponding NAND gates 480 and 479. NAND gates 479 and 480 are then the discriminating NAND gates setting whether the least significant bit or the less significant bit count out of counter 458 is a positive or a negative count, i.e., a forward or reverse count. In this manner, the accuracy or scale of the *lsb* leads is increased by a factor of two by the appropriate selection of polarity.

Comparators 471 and 472 are enabled by a function of the G signal (FIG. 3) from the proximity sensor circuit. In order to provide appropriate phasing of the G signal, an inverter is inserted in series, such inverter being formed in the manner of a NAND gate 485.

The less significant bit *lsb* leads from counter 458 are in turn brought out to connect to the circuit in FIG. 10. More specifically, the circuit in FIG. 10 corresponds to the weight circuit 50 of FIG. 3 which is shown in the form of idealized elements in FIG. 4. In this instance, real circuit chips are incorporated for the above circuits. More specifically, the lsb signal branch is connected to the input of a multiplexer 301 which at the strobe terminal is connected to the proximity detector circuit, i.e., signal Z and which at the select terminal is connected to the *a*=*b* signal from comparator 472. Multiplexer 301 is a conventional chip multiplexer such as the multiplexer produced by Texas Instruments under the Model No. SN74157 which alternatively selects between two sets of data according to the strobe input. The alternative other inputs to multiplexer 301 are fixed highs developed from the voltage *b*+ such that multiplexer 301 is either all high or receives the lsb signal combination from counter 458. The output of multiplexer 301 is connected to an encoder 302 which may be any encoder in the art by which in this instance has been selected as an ROM device. For the purpose of this description, ROM devices are considered essentially memory devices which are fixed in their state by appropriate techniques such as metal masking, where the alternative strobing off the multiplexer 301 effects address incrementing. The ROM device therefore selects an output corresponding to a particular address developed at the input and in this sense operates as a conventional encoder. What is desired in this instance is to convert four-bit binary data into eight-bit binary precision. Such can be conventionally developed by appropriate fanout of the four-bit input in terms of conventional logic gates in any combination. As will be discussed by way of reference to FIG. 15, there are sixteen discrete intervals of commutation of any 180° phase interval, all of unequal length symmetrically about the 90° center. Accordingly, a fan-out of 16 to 64 is all that is necessary in order to establish the encoding, since complementing functions can be used above 90°. In this application an ROM device produced by Texas Instruments under the Model No. SN74188 has been selected since the data outputs thereof are in the form of an eight-bit binary thus giving a range of 128. The range can be further expanded by the half power connection to the ROM device designated by the signal H. It is to be noted that while the input to the ROM device can at best define 16 discrete integers, the output must necessarily be in finer form since the precision of the commutation will depend on the fineness of the minimal increments from the ROM device.

Referring to FIG. 10, the respective eight output leads combining to form a count of 128 from the encoder 302 are then brought down to the preset terminals of two series connected four-bit counters 303 and 304 which again are selected as Texas Instruments Model No. SN74161 Synchronous Counters. Counters 303 and 304 are again connected as an *n*-bit counter where counter 303 carries into counter 304. The carry terminal of counter 304 is collected together with the 1° signal $P_1$ to a NAND gate 305. Simultaneously, the 1° signal $P_1$ is connected to the clock terminals of counters 303 and 304. Accordingly, counters 303 and 304 will produce a carry to gate 305 at a predetermined count which is set in through the data inputs from the ROM encoder 302.

The output of gate 305 is fed in parallel to the clock inputs of two D-type flip-flops 306 and 307. Flip-flop 306 connects the Q output to the clear terminal of counters 303 and 304. Flip-flop 307, however, is preset by the signal $P_1$ and is therefore synchronized with the leading edge transient thereof. The Q output of flip-flop 307 is again connected to the clear terminals of a plurality of ripple counters connected in cascade, specifically ripple counters 308, 309 and 310. Ripple counters 308, 309 and 310 are again the Variable Modulo Counters by Fairchild Semiconductor, Model No. 9305. The clock input to the first stage or ripple counter 308 is received from the $P_1$ signal with the counter 310 being set at the proper modulo pin to output every 360° of the A.C. signal. This signal is then collected with the signal $P_3$ in an OR gate 311 which is connected to the AND gates 163 and 164 which also receive respective outputs from NAND gates 479 and 480 to gate SCR's 165 and 166 (FIG. 4). Again, in this instance, gate 305 is a Texas Instruments SN7400 gate, flip-flops 306 and 307 are Texas Instruments SN7474 flip-flops while the OR gate 311 is a Texas Instruments SN7402 OR gate for the purposes described above.

The operation of the present invention will now be described with reference to FIGS. 1–10 and with particular reference to the timing charts and functions shown in FIGS. 11–15. As shown in FIG. 11, the measure of velocity is developed by the clock signal C which is shown as a continuous chain of pulses of equal width. Immediately below is a signal designated $\overline{Z}$ which is a complement of the signal Z, produced by the flip-flop 142 of FIG. 8. The signal transients of the two photo sensors 58 and 59 are shown as the signals TL and TT which are then synchronized through flip-flops 405 and 415 with signal C to form the signals shown as signals TCL and TCP immediately below. The next two signal charts are the FCL and FCT signals corresponding to the Q outputs of flip-flops 416 and 417. The next two signal charts are the signals corresponding to the Q outputs of flip-flops 425 and 426, and are therefore designated $Q_{425}$ and $Q_{426}$. The output of NAND gate 428 is shown as a stopclock signal SC which pulls flip-flop 429 down to the $\overline{Q}$ state. Flip-flop 429 is pulled up to the Q state by the $\overline{Q}$ output of flip-flop 416 which is also the leading edge of the signal chart FCL. The Q lead or the Q terminal of flip-flop 429 is shown as the clock control signal CC which allows the passage of the pulse burst through the dynamic flip-flop circuit 150 in FIG. 3, or which allows the passage of the pulse burst through the NAND gate 430 (FIG. 8). This pulse burst signal, previously identified as signal V (FIG. 3), is passed in parallel to the clock inputs of the four-bit counters 451, 452 and 453. The pulse burst accumulated in the four-bit counters 451, 452 and 453 is then transferred out to counters 458, 459 and 460 upon receipt of the pulse $Q_{426}$ and is maintained as a parallel count output producing the signal branches lsb and msb during the duration or aperture formed between the end of the signal SC to the end of the signal Z. Signal Z, through inverter 435, therefore effects a periodic reset or periodic clear of the counters 458, 459 and 460. Signals $Q_{425}$ and $Q_{426}$ synchronize the end of the pulse count with the pulse polarity of signal C, thus providing an appropriate round off corresponding to an integer count of pulses.

Figure 13:
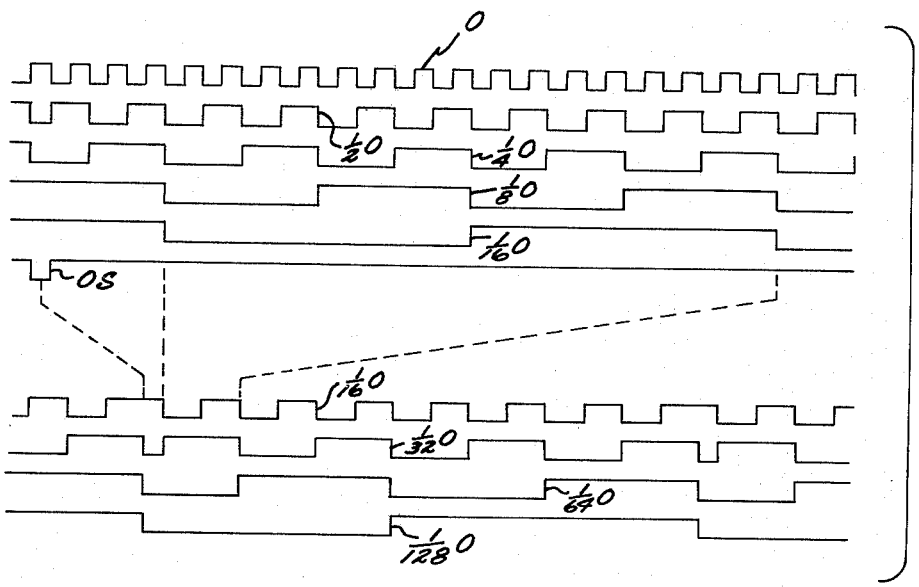
FIG. 13 is yet another timing diagram illustrating the operation of FIGS. 2 and 3.

By way of reference to FIG. 13, the timing events shown in FIG. 7 will now be discussed. Referring back to FIG. 7, the $\overline{Q}$ output of flip-flop 181 is shown as a signal O which is converted to a ½ O signal at the first binary bit level of the four-bit counter 580. The charts immediately below the ½ O signal are the ¼, ⅛ and 1/16 O binary bits of the same counter. The carry of counter 580 is in turn connected to counter 581 such that the four bottom curves or charts represent 1/16, 1/32, 1/64 and 1/128 O, respectively. In this manner, a 1/128 division is carried out through counters 580 and 581. The carry of counter 581 is collected at the NAND gate 582 with the Q output of flip-flop 181, thus providing the ripple-through carry loop of flip-flop 570 and gate 571, which adds a load short count or one unit count signal OS in order to more evenly approximate the 1° time increment, i.e., a 46.2 microsecond period. Accordingly, the 1/128 O signal approximates the 1° phase increments of the signal E, referred to hereinabove as signal $P_1$. It is to be noted that the signal OS corresponding to the signal pulse adjustment through the ripple carry circuit is necessary to match the integer division of the two four-bit counters. Thus, it is only necessary because of the particular selection of a 10 megacycle crystal, and would not be necessary if any other selection of crystal frequency elements and count lengths can be accommodated.

In FIG. 12, the 1° pulse signal $P_1$ is divided down by 2, shown as a signal ½ $P_1$, being developed in the divide-by-2 segment of the ripple counter 591. The next charts immediately below are charts of divide-by-2 and divide-by-4 staggered to form a divide-by-6 count corresponding to the 6° signal $P_2$. The divide-by-2 and divide-by-4 staggered signals are respectively designated as a ½ R and a ½ P signal corresponding to the selected output terminals of ripple counter 591, which is then converted by a divide-by-5 stagger shown in signal charts $Q_1$ and $Q_2$ to a 30° phase increment signal, subsequently divided down by 2 again in counter 595 to a 60° phase increment signal. The 30° and the 60° phase increment signals are combined in the signal trace $Q_3$ to form a 180° phase increment signal. The 180° signal is then converted in the signal chart $Q_4$ to a 360° signal defining the zero crossings of an artificial 60-cycle A.C. signal equal to signal E. The above signals are developed respectively in counters 595 and 598.

Figure 14:
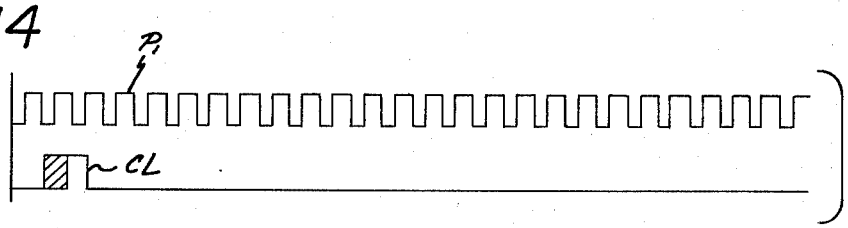
FIG. 14 is a timing diagram illustrating the phase jamming function of the circuit in FIG. 3.

In addition, as shown in FIG. 14, counters 591, 595 and 598 are synchronized with the zero crossings of signal E by way of flip-flops 187, 188 and 189. The Q output of flip-flop 189 repetitively clears counters 591, 595 and 598 which is shown in the second trace in FIG. 14 as signal CL. Signal CL also sets the phase synchronization for the shift register function described hereinabove. More particularly, the *lsb* leads are converted through the ROM 302 (FIG. 10) to drive counters 308, 309 and 310 as a shift register which upon a particular count developed out of ROM 302 will shift out the appropriate gating function to the SCR's 165 and 166 of FIG. 4.

Figure 15:
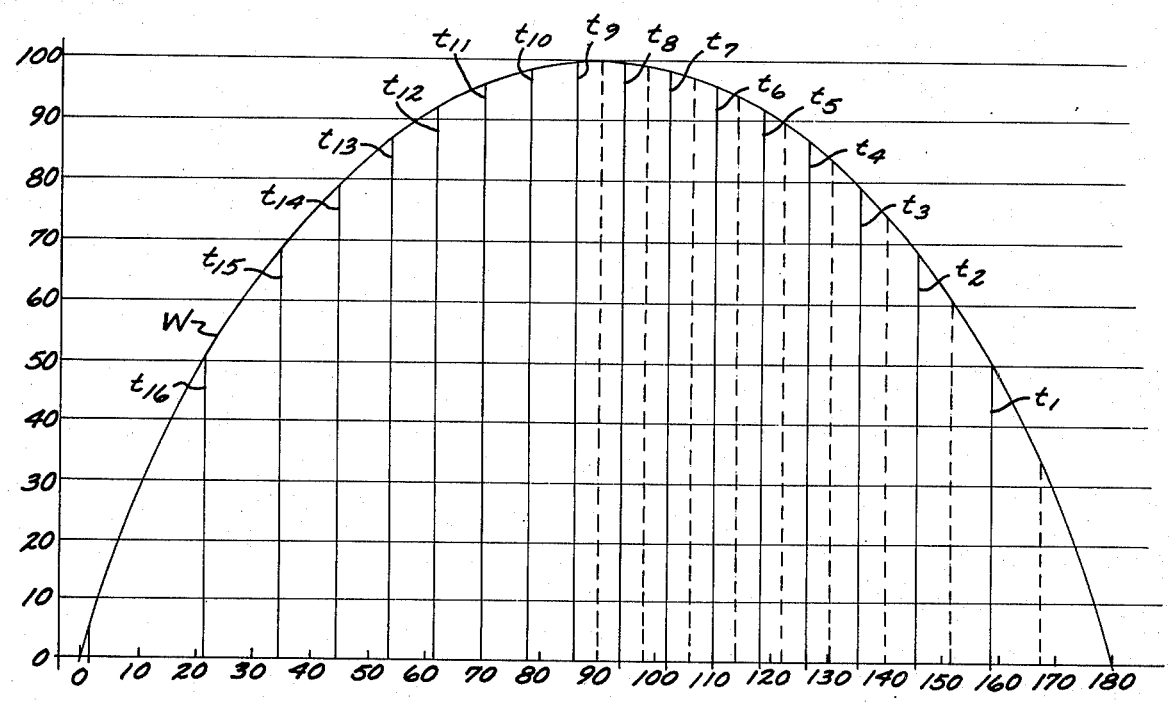
FIG. 15 is a phase commutation diagram performed by circuit 55 in FIG. 1.

By way of example shown in FIG. 15, it is shown that the discrete levels of count developed through the pulse bursts V are converted to approximately equal increments of power during the commutation of the A.C. signal to the winding 30. The coordinates of FIG. 15 are shown as a 100% ordinate and a 0°–180° abscissa across which there is drawn one-half of a sinusoidal function shown as waveform W. This waveform is shown incremented into sixteen discrete intervals, labeled $t_1$–$t_{16}$, either between 0 and 180 or between 90 and 180. It is to be noted that the alternative manner of commutation is facilitated by the one-half power terminal to the ROM 302. In this manner, two distinct gain levels, either a gain factor of one or a gain factor of one-half can be pushed through the system, providing a certain amount of selectivity in the response dynamics of the system. Such gain selection allows for reduction or increase in gain where velocity errors are either less or more critical. It is to be noted that in stationing operations by which the train velocity is close to zero, lower steady state errors are possible and therefore a lower gain can be tolerated.

The foregoing description of the system has been carried through by reference to a particular ROM coded to define the function of FIG. 15. While there are many ways of coding a memory device such as the ROM 302, the function thereof is best explained by reference to FIG. 16.

Figure 16:
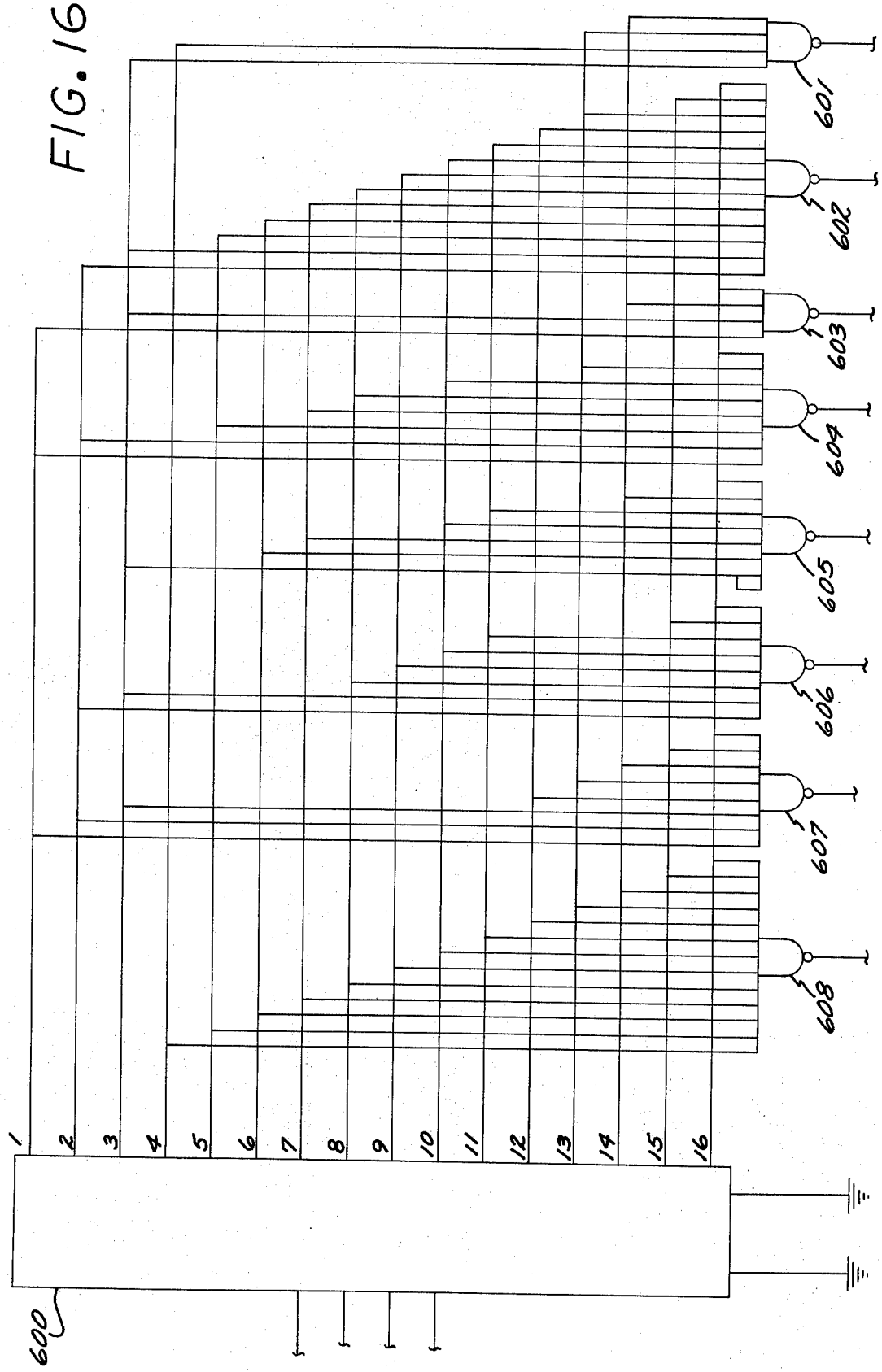
FIG. 16 is a logic diagram of an encoding function performed in FIG. 10.

In FIG. 16, a logical fan-out is shown between the four-bit lsb input through multiplexer 301 which is converted to an eight-bit precision output through the ROM. In this manner, even though the multiplexer 301 outputs are essentially address calling outputs, the operation thereof is substantially similar to the input of a conventional encoder formed out of very conventional gates. For purposes of this description, there are 16 distinct states at the input which correspond to 16 distinct states at the output. These are developed by a 4–16 line decoder 600 such as a Texas Instruments SN74154 decoder which are then combined at the inputs of NAND gates 601–608 to produce the following code format:

| Input | Output Gates 601–608 |
|---|---|
| 1) 0000 | 01001100 |
| 2) 0001 | 01101010 |
| 3) 0010 | 01110111 |
| 4) 0011 | 10000001 |
| 5) 0100 | 10001010 |
| 6) 0101 | 10010010 |
| 7) 0110 | 10011010 |
| 8) 0111 | 10100010 |
| 9) 1000 | 10101010 |
| 10) 1001 | 10110010 |
| 11) 1010 | 10111010 |
| 12) 1011 | 11000010 |
| 13) 1100 | 11001011 |
| 14) 1101 | 11010101 |
| 15) 1110 | 11100010 |
| 16) 1111 | 11111110 |

From the foregoing description, it should now be clearly apparent that a convenient technique is developed by which a sampled data system, operating between limits, can effectively duplicate all of the characteristics of a linear servo. In addition, the system developed hereby biases out the conventional nonlinearities of a commutated system by assigning larger increments of commutation at the 0° and 180° crossings while reducing the commutation intervals around the 90° interval. All these features are accomplished by way of standardized IC chips, and utilizing conventional systems.

Obviously, many modifications and variations of the present invention may be made with regard to the foregoing detailed description without departing from the spirit of the invention.

What is claimed is:

1. A vehicle propulsion system comprising:
   a guideway;
   an excitation source producing an alternating electrical signal;
   a vehicle disposed for rolling along said guideway;
   a secondary mounted on the underside of said vehicle;
   a plurality of primary winding segments disposed in said guideway;
   speed trap means to determine the speed of said vehicle and generate a digital velocity signal therefrom;
   comparison means to compare said velocity signal to a reference signal and determine the deviation of the speed of said vehicle from a preselected speed;
   a plurality of control means each disposed in associated relationship with a corresponding one of said winding segments and operatively connected to commutate said alternating electrical signal to said winding segments in commutation increments proportional in power to said deviation of the speed of said vehicle from a preselected speed; and
   a plurality of proximity means disposed in associated relationship with corresponding ones of said control means for completing the connection between said corresponding ones of said winding segments and said control means when said vehicle is located on said guideway in inductive relationship between said secondary and said one winding segment and for concurrently disabling selected other ones of said control means.

2. Apparatus according to claim 1, further comprising:
   said control means including a speed trap disposed to sense the passing duration of said vehicle over a selected increment of said guideway, a reference source of oscillatory signal of a predetermined frequency, gate means connected to said trap and said reference source for passing a burst of said oscillatory signal concurrent with the passing duration of said vehicle over said speed trap, counting means connected to receive the output signal from said gate means for producing an output signal indicative of the number of oscillations passed by said gate means, comparison means connected to said counting means for comparing the output signal thereof against a predetermined count and for producing an error signal indicative of the difference therebetween and commutation means connected to receive said error signal for periodically completing, in synchronism with said alternating signal, a conductive path between said alternating signal and said winding segment.

3. Apparatus according to claim 2 wherein:
   said commutation means includes weight means interposed between said error signal and said winding segment for controlling the duration of completion of said conductive path to provide a proportional relationship between said error signal and the propulsive power developed by said winding segment.

4. A linear induction motor propulsion system, comprising:
   a guideway;
   a vehicle disposed for rolling along said guideway;
   a secondary mounted on the underside of said vehicle;
   a plurality of primary winding segments disposed in said guideway;
   a source of alternating electrical power;
   velocity detection means disposed along said guideway for detecting the rate of propagation of said vehicle adjacent said winding segments and producing a velocity signal corresponding thereto;
   error detection means connected to receive said velocity signal and including means for storing a selected signal corresponding to a preselected velocity, said error detection means comparing said velocity signal with said selected velocity signal to produce an error signal corresponding to the difference therebetween; and commutation means connected between said primary winding segment and said source of alternating power and said source of alternating power and adapted to receive said error signal for selectively connecting said source to said winding segment to apply increments of propulsive excitation to said winding segment proportionally related to said error signal.

5. A propulsion system according to claim 4 further comprising:

proximity sensing means disposed adjacent said primary winding segments for producing a proximity signal when said secondary is proximate thereof; and enabling means interposed between said commutation means and said error signal and connected to receive said proximity detection means output signal for connecting said commutation means to said error signal when said vehicle is proximate said winding segments.

6. Apparatus according to claim 5 further comprising:

timing means including a source of oscillatory electrical signal of a predetermined frequency, division means connected to receive said oscillatory signal for producing a first timing signal at a predetermined ratio with said oscillatory signal and a second timing signal at a predetermined second ratio to said oscillatory signal, counting means connected to receive said second timing signal and said signal from the source of alternating power for accumulating a predetermined count of oscillations of said second timing signal within each cycle of said alternating electrical power, and enabling means connected between said error detection means and said commutation means and adapted to receive said predetermined count for completing the circuit between said error signal and said commutation means at the completion of said count.

7. Apparatus according to claim 6 further comprising:

daisy chain circuit means connected to receive selected ones of said proximity detection means output signals and connected to selected other ones of said proximity detection means for disabling said other ones of said proximity detection means when said selected ones produce a proximity signal.

8. A speed control system for correcting the speed deviation of a vehicle traveling along a guideway, comprising:

propulsion means comprising a plurality of primary winding segments mounted in said guideway to apply selective amounts of propulsive force to said vehicle;

a source of electrical excitation signal selectively connected to selected winding segments of said propulsive means;

velocity detection means disposed along said guideway for detecting the rate of propagation of said vehicle therealong and producing a velocity signal corresponding thereto;

error detection means connected to receive said velocity signal and including means for storing a selected signal corresponding to a preselected speed, said error detection means comparing said velocity signal against said preselected speed signal to produce an error signal corresponding to the difference therebetween; and commutation means connected between said propulsion means and said excitation signal in error signal receiving connection to said error detection means, for selectively connecting said propulsion means to said excitation signal to apply increments of propulsive force to said vehicle proportionally related to said error signal.

9. A speed control system according to claim 8 wherein:

said error detection means includes time interval measuring means responsive to the propagation of said vehicle thereacross for producing said velocity signal in the form of a pulse burst converted to a plurality of parallel signals corresponding in state to the duration of said pulse burst.

10. A speed control system according to claim 9 wherein:

said excitation signal is an electrical alternating signal of a fixed frequency; and said commutation means includes phase jamming means adapted to synchronize the application of said increments of propulsive force with said alternating signal.

11. Apparatus according to claim 10 wherein:

said propulsive means further includes a plurality of inductor segments of a linear inductor motor; and said vehicle includes a secondary adapted for inductive interaction with said segments.

12. A propulsive system for propelling a vehicle along a guideway at a preselected speed, comprising:

a plurality of linear inductor segments disposed along said guideway;

a secondary mounted in said vehicle for magnetic interaction with said segments;

a plurality of selective excitation means which includes signal storage means for storing a preselected stored signal corresponding to a preselected velocity of propagation of said vehicle over said segment, velocity detection means disposed adjacent said segment for detecting the rate of propagation of said vehicle thereat, error detection means connected to receive said velocity signal and said stored signal for comparing said velocity and stored signals and producing an error signal proportional to the difference therebetween, and commutation means connected to said error signal for exciting said segment to an increment of propulsive force proportional to said error signal; and a corresponding plurality of proximity detection means each disposed along said guideway in adjacent relationship with corresponding ones of said segments for sensing the proximity of said vehicle and selectively connecting the corresponding ones of said selective excitation means to said segments when said vehicle is in inductive proximity therewith.

13. Apparatus according to claim 12, further comprising:

daisy chain circuit means connected to said proximity detector means for selectively disabling selected other ones of said excitation means.

14. A velocity control system comprising:

a wheeled vehicle adapted to roll in response to increments of force applied thereto;

a plurality of linear inductor segments disposed in a path for applying increments of force to said vehicle;

a corresponding plurality of selective excitation means adapted to excite a corresponding one of said segments;

a plurality of velocity sensing means each disposed adjacent a corresponding one of said segments for producing an error signal corresponding to the difference between the velocity of said vehicle approaching said segment and a preselected velocity; and switching means connected to receive said error signal and interposed between corresponding ones of said excitation means and said segments for exciting said segments to a force increment proportional to said error signal.

15. A velocity control system comprising:

sensing means disposed to detect the time interval of propagation of a vehicle across a path increment for producing a gating signal substantially equal in duration to said time interval;

a source of alternating electrical signal;

pulse train means connected to receive said alternating signal for producing a first pulse rate signal and a second pulse rate signal, said second pulse rate signal being periodically synchronized with said alternating signal;

gate means connected to receive said gating signal and said first pulse rate signal for passing selected bursts of said first pulse rate signal occurring concurrently with the presence of said gating signal;

error detection means connected to receive said bursts from said gate means and comparing the number of pulses in said bursts against a preselected number to produce an error signal indicative of the difference therebetween;

commutation means connected to receive said error signal and said second pulse rate signal for commutating the conduction of said alternating signal in increments synchronized with said second pulse rate signal in proportional relationship of power with said error signal; and propulsion means connected to receive said commutated alternating signal for producing increments of propulsive force corresponding thereto.

* * * * *